United States Patent
Park

(10) Patent No.: US 9,655,087 B2
(45) Date of Patent: May 16, 2017

(54) CONFIGURATION AND MAPPING OF UPLINK CONTROL CHANNEL RESOURCE

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 44 days.

(21) Appl. No.: 13/953,180

(22) Filed: Jul. 29, 2013

(65) Prior Publication Data

US 2014/0050165 A1 Feb. 20, 2014

(30) Foreign Application Priority Data

Aug. 16, 2012 (KR) .......... 10-2012-0089253
Aug. 17, 2012 (KR) .......... 10-2012-0089881
Aug. 24, 2012 (KR) .......... 10-2012-0093109
Dec. 13, 2012 (KR) .......... 10-2012-0145416

(51) Int. Cl.
  *H04W 72/04* (2009.01)
  *H04L 1/00* (2006.01)
  *H04L 1/18* (2006.01)

(52) U.S. Cl.
  CPC ....... *H04W 72/0413* (2013.01); *H04L 1/0038* (2013.01); *H04L 1/1854* (2013.01); *H04L 1/1861* (2013.01)

(58) Field of Classification Search
  CPC  H04W 72/0413; H04W 72/0406; H04L 1/00; H04L 1/1861; H04L 1/0061; H04L 1/0038; H04L 1/1854
  See application file for complete search history.

(56) References Cited

U.S. PATENT DOCUMENTS 9,198,181 B2 * 11/2015 Blankenship ..... H04W 72/0453
2012/0320846 A1 12/2012 Papasakellariou et al.
2013/0028219 A1 1/2013 Lee et al.
2013/0039291 A1 2/2013 Blankenship et al.
(Continued)

FOREIGN PATENT DOCUMENTS

KR   10-2011-0117012 A   10/2011

OTHER PUBLICATIONS

Samsung, "HARQ-ACK PUCCH Resources in Response to ePDCCH Detections", R1-122259, 3GPP TSG RAN WG1 Meeting #69, Prague, Czech Republic, May 21-25, 2012, pp. 1-2.
(Continued)

*Primary Examiner* — Habte Mered
(74) *Attorney, Agent, or Firm* — IP Legal Services, LLC

(57) ABSTRACT

The disclosure is related to configuration and mapping of uplink control channel resources. Particularly, the present disclosure relates to configuring and mapping uplink control channel resources for user equipment receiving downlink control information through a downlink control channel newly defined in a data region. Furthermore, the present disclosure relates to configuring and mapping uplink control channel resources for uplink HARQ-ACK/NACK feedback of user equipment. Herein, the uplink HARQ-ACK/NACK feedback may be performed by the user equipment in response to a downlink data channel assigned according to downlink scheduling information transmitted through such new downlink control channel.

18 Claims, 8 Drawing Sheets

(56) References Cited

U.S. PATENT DOCUMENTS

| | | | |
|---|---|---|---|
| 2013/0114530 A1 | 5/2013 | Chen et al. | |
| 2013/0194931 A1* | 8/2013 | Lee | H04L 5/0053 370/241 |
| 2013/0215842 A1* | 8/2013 | Han et al. | 370/329 |
| 2013/0229997 A1 | 9/2013 | Lunttila et al. | |
| 2013/0230017 A1* | 9/2013 | Papasakellariou | H04W 72/0406 370/330 |
| 2013/0242890 A1 | 9/2013 | He et al. | |
| 2013/0322352 A1* | 12/2013 | Han | H04W 72/0413 370/329 |
| 2014/0003375 A1* | 1/2014 | Nam | H04W 72/0406 370/329 |
| 2014/0036810 A1 | 2/2014 | Harrison et al. | |
| 2014/0078980 A1 | 3/2014 | Frenne et al. | |

OTHER PUBLICATIONS

Samsung, "Multiplexing Distributed and Localized ePDCCHs", R1-122256, 3GPP TSG RAN WG1 #69, Prague, Czech Republic, May 21-25, 2012, pp. 1-5.

LG Electronics, "Discussion on PUCCH Resource for ePDCCH", R1-122314, 3GPP TSG RAN WG1 Meeting #69, Prague, Czech Republic, May 21-25, 2012, pp. 1-2.

Pantech, "PUCCH resource allocation in response to E-PDCCH", R1-121367, 3GPP TSG RAN WG1 #68bis, Jeju, Korea, Mar. 26-30, 2012, pp. 1-2.

Nokia Siemens Networks et al., "HARQ-ACK resource allocation for data scheduled via ePDCCH", R1-122428, 3GPP TSG RAN WG1 Meeting #69, Prague, Czech Republic, May 21-25, 2012, pp. 1-2.

Korean Intellectual Property Office, International Search Report for International Application No. PCT/KR2013/006757, Nov. 12, 2013.

Korean Intellectual Property Office, Written Opinion of the International Searching Authority for International Application No. PCT/KR2013/006757, Nov. 12, 2013.

Mediatek Inc., "Necessity of Multiplexing of Localized and Distributed ePDCCH Parts in the Same PRBs", R1-122168, 3GPP TSG RAN WG1 Meeting #69, Prague, Czech Republic, May 21-25, 2012, pp. 1-3.

Panasonic, "Definitions of eREG and eCCE", R1-122201, 3GPP TSG RAN WG1 Meeting #69, Prague, Czech Republic, May 21-25, 2012, pp. 1-4.

LG Electronics, "On ePDCCH Search Space Design Supporting Localized and Distributed Transmission", R1-122309, 3GPP TSG RAN WG1 Meeting #69, Prague, Czech Republic, May 21-25, 2012, pp. 1-11.

Mediatek Inc., "Physical Structure of ePDCCH and Its Mulitplexing with PDSCH", R1-120629, 3GPP TSG RAN WG1 #68, Dresden, Germany, Feb. 6-10, 2012, pp. 1-3.

Korean Intellectual Property Office, International Search Report for International Application No. PCT/KR2013/005959, Oct. 22, 2013.

Korean Intellectual Property Office, Written Opinion of the International Searching Authority for International Application No. PCT/KR2013/005959, Oct. 22, 2013.

Pantech, "PUCCH resource allocation in response to E-PDCCH", R1-122456, 3GPP TSG RAN WG1 #69, Prague, Czech Republic, May 21-25, 2012, pp. 1-3.

Asustek, "PUCCH Resource Allocation Corresponding to ePDCCH", R1-122614, 3GPP TSG RAN WG1 #69, Prague, Czech Republic, May 21-25, 2012, pp. 1-2.

* cited by examiner

CONFIGURATION AND MAPPING OF UPLINK CONTROL CHANNEL RESOURCE

CROSS REFERENCE TO PRIOR APPLICATIONS

The present application claims priority under 35 U.S.C. §119 to Korean Patent Application No. 10-2012-0089253 (filed on Aug. 16, 2012), Korean Patent Application No. 10-2012-0089881 (filed on Aug. 17, 2012), Korean Patent Application No. 10-2012-0093109 (filed on Aug. 24, 2012), and Korean Patent Application No. 10-2012-0145416 (filed on Dec. 13, 2012), which are hereby incorporated by reference in their entirety.

BACKGROUND

The present disclosure relates to configuration and mapping of uplink control channel resources. Particularly, the present disclosure relates to methods and apparatuses for configuring and mapping uplink control channel resources for user equipment receiving downlink control information through a downlink control channel adopted (or defined) in a data region. Furthermore, the present disclosure relates to methods and apparatuses for configuring and mapping uplink control channel resources for uplink HARQ-ACK/NACK feedback of user equipment. Herein, the uplink HARQ-ACK/NACK feedback may be performed by the user equipment in response to a downlink data channel assigned according to downlink scheduling information transmitted through such new downlink control channel.

A wireless communication system has been designed to transmit a mass amount of data to many subscribers. However, it is difficult to increase the capacity of the wireless communication system due to limited resources of a control region. In order to overcome such limitation, use of a downlink control channel located in a data region in order to transmit downlink control information might be required.

Meanwhile, a downlink control channel is newly defined in the data region in order to improve performance and capacity of a downlink control channel in the wireless communication system. User equipment may receive downlink scheduling information through such a new downlink control channel. Accordingly, configuring and/or mapping uplink control channel resources might be required such that the user equipment can perform a feedback transmission of uplink HARQ-ACK/NACK.

SUMMARY

The present embodiments may provide methods and apparatuses for configuring and/or mapping uplink channel resources for uplink HARQ-ACK/NACK of user equipment, in the case that the user equipment is configured to receive downlink control information (DCI) through an enhanced physical downlink control channel (EPDCCH).

In accordance with at least one embodiment, a method may be provided for configuring an uplink control channel resource in a transmission/reception point transmitting control information for user equipment through a data region of resource-block pairs in a subframe. The method may include assigning at least one enhanced physical downlink control channel (EPDCCH) set, wherein each EPDCCH set includes an X number of resource-block pairs in the subframe, and the X is a natural number which is greater than or equal to "1" and is less than or equal to the number of physical resource-block pairs (PRB pairs) associated with a downlink bandwidth; and transmitting information indicating an uplink control channel resource starting offset for each of the at least one EPDCCH set, to the user equipment.

In accordance with another embodiment, a method may be provided for mapping an uplink control channel resource in user equipment. The method may include receiving information indicating an uplink control channel resource starting offset for each of at least one enhanced physical downlink control channel (EPDCCH) set, from a transmission/reception point, wherein each EPDCCH set includes an X number of resource-block pairs in the subframe, and the X is a natural number which is greater than or equal to "1" and is less than or equal to the number of physical resource-block pairs (PRB pairs) associated with a downlink bandwidth; receiving downlink scheduling control information through at least one enhanced control channel element (ECCE) included in one EPDCCH set of the at least one EPDCCH set, from the transmission/reception point; and performing an uplink control channel resource mapping for ACK/NACK associated with a physical downlink shared channel (PDSCH) assigned according to the downlink scheduling control information, using at least one of (i) the information indicating the uplink control channel resource starting offset, (ii) a lowest index of the at least one ECCE, (iii) antenna port information associated with a transmission of the downlink scheduling control information, and (iv) dynamic offset indication information, as a resource determination component.

In accordance with still another embodiment, a transmission/reception point may be provided for transmitting control information for user equipment through a data region of resource-block pairs in a subframe. The transmission/reception point may include a control processor and a transmitter. The control processor may be configured to assign at least one enhanced physical downlink control channel (EPDCCH) set. Herein, each EPDCCH set includes an X number of resource-block pairs in the subframe, and the X is a natural number which is greater than or equal to "1" and is less than or equal to the number of physical resource-block pairs (PRB pairs) associated with a downlink bandwidth. The transmitter may be configured to transmit information indicating an uplink control channel resource starting offset for each of the at least one EPDCCH set, to the user equipment.

In accordance with still another embodiment, user equipment may be provided. The user equipment may include a receiver and a control processor. The receiver may be configured (a) to receive information indicating an uplink control channel resource starting offset for each of at least one enhanced physical downlink control channel (EPDCCH) set, from a transmission/reception point, wherein each EPDCCH set includes an X number of resource-block pairs in the subframe, and the X is a natural number which is greater than or equal to "1" and is less than or equal to the number of physical resource-block pairs (PRB pairs) associated with a downlink bandwidth, and (b) to receive downlink scheduling control information through at least one enhanced control channel element (ECCE) included in one EPDCCH set of the at least one EPDCCH set, from the transmission/reception point. The control processor may be configured to perform an uplink control channel resource mapping for ACK/NACK associated with a physical downlink shared channel (PDSCH) assigned according to the downlink scheduling control information, using the information indicating the uplink control channel resource starting offset and a lowest index of the at least one ECCE as resource determination components.

DETAILED DESCRIPTION OF EMBODIMENTS

Figure 1:
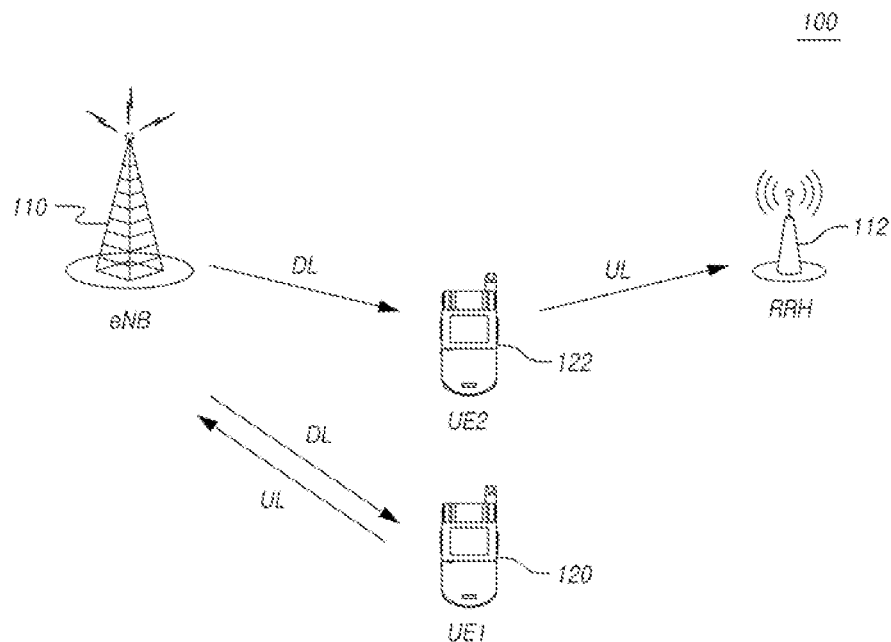
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

In accordance with at least one embodiment, a wireless communication system may be widely used to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point.

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of eNB 110 and RRH 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power or a low transmission power within a macrocell region. The transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

Figure 2:
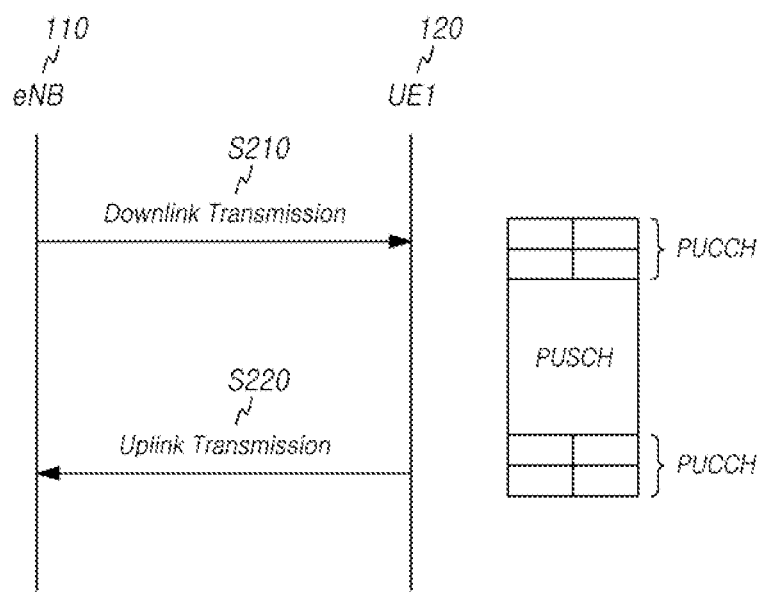
FIG. 2 and FIG. 3 are flow charts illustrating a downlink transmission and an uplink transmission in the wireless communication system shown in FIG. 1.
Figure 3:
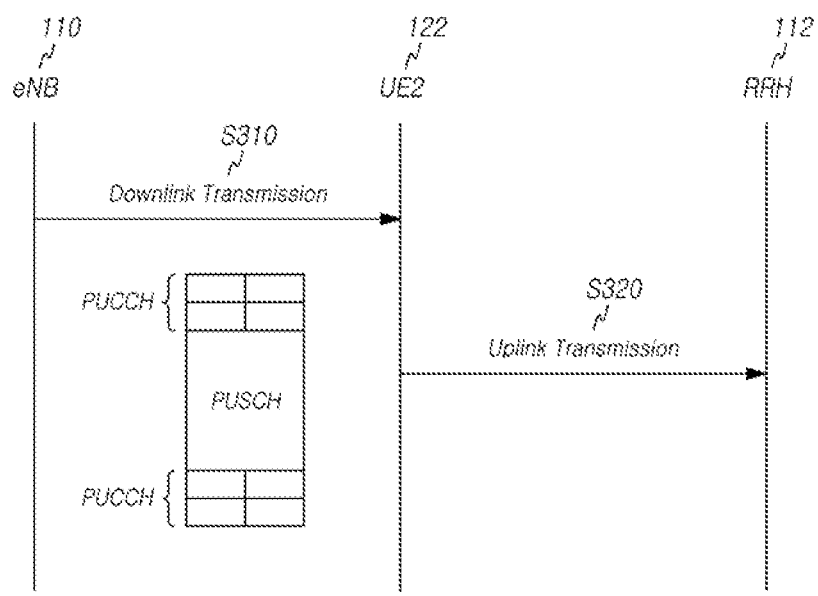

FIG. 2 and FIG. 3 are flowcharts illustrating a downlink transmission and an uplink transmission in the wireless communication system shown in FIG. 1.

Referring to FIG. 2 and FIG. 3, at steps S210 and S310, a first transmission/reception point (e.g., eNB 110) corresponding to one of transmission/reception points (e.g., 110 and 112) may perform a downlink transmission to user equipment 120 and 122. eNB 110 may transmit PDSCH corresponding to a primary physical channel, for unicast transmission. Furthermore, eNB 110 may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

Referring to FIG. 2, at step 220, UE 1 (120) may perform an uplink transmission to eNB 110 corresponding to the first transmission/reception point. Referring to FIG. 3, at step S320, UE 2 (122) may transmit an uplink signal to a second transmission/reception point (e.g., RRH 112) corresponding to one of transmission/reception points 110 and 112. Alternatively, according to radio environments, UE 1 (120) may perform an uplink transmission to RRH 112, and UE 2 (122) may perform an uplink transmission to eNB 110. The number of user equipment may be "2" or more. In the following embodiments, descriptions will be given under the assumption that one of two user equipment transmits an uplink signal to eNB 110 and the other transmits an uplink signal to RRH 112.

Referring back to FIG. 2 and FIG. 3, UE 1 (120) and UE 2 (122) may transmit a scheduling request (SR), HARQ-ACK associated with received downlink data channel transmission blocks, and/or UE reporting associated with a downlink channel state to the first transmission/reception point (e.g., eNB 110) and the second transmission/reception point (e.g., RRH 112) through an uplink control channel (e.g., PUCCH), respectively. Furthermore, UE 1 (120) and UE 2 (122) may transmit uplink data through an uplink data channel (e.g., PUSCH). UE 1 (120) and UE 2 (122) may transmit a reference signal for demodulation of an uplink channel, such as a demodulation reference signal (DM-RS), to the first transmission/reception point (e.g., eNB 110) and the second transmission/reception point (e.g., RRH 112), respectively.

Hereinafter, in the present specification, UE 1 (120) and UE 2 (122) may be integrally referred to as "user equipment 120." The first transmission/reception point (e.g., eNB 110) and the second transmission/reception point (e.g., RRH 112) may be integrally referred to as "transmission/reception point 110."

The PUCCH may support multiple formats as shown in Table 1 below.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

PUCCH formats 1/1a/1b may be used for transmission of a scheduling request (SR) and HARQ-ACK. PUCCH formats 2/2a/2b may be used for transmission of a channel quality indicator (CQI), a precoding matrix indicator (PMI), and/or a rank indication (RI). PUCCH format 3 may be used for transmission of a plurality of HARQ-ACKs/NACKs.

All PUCCH formats may use a cell-specific cyclic shift (CS), i.e., $n_{cs}^{cell}(n_s,l)$. Herein, $n_{cs}^{cell}(n_s,l)$ may be defined by Formula 1 below, according to symbol number l and slot number $n_s$.

$$n_{cs}^{cell}(n_s,l) = \sum_{i=0}^{7} c(8N_{symb}^{UL} \cdot n_s + 8l + i) \cdot 2^i \qquad \text{[Formula 1]}$$

In Formula 1, $N_{symb}^{UL}$ represents the total number of single carrier frequency division multiple access (SC-FDMA) symbols used in one uplink slot. c(i) denotes a pseudo-random sequence, and an initial value $c_{init}$ may be a cell identity $N_{ID}^{cell}$. Accordingly, cyclic shift (CS) of PUCCH may be determined based on the cell identity.

Figure 4:
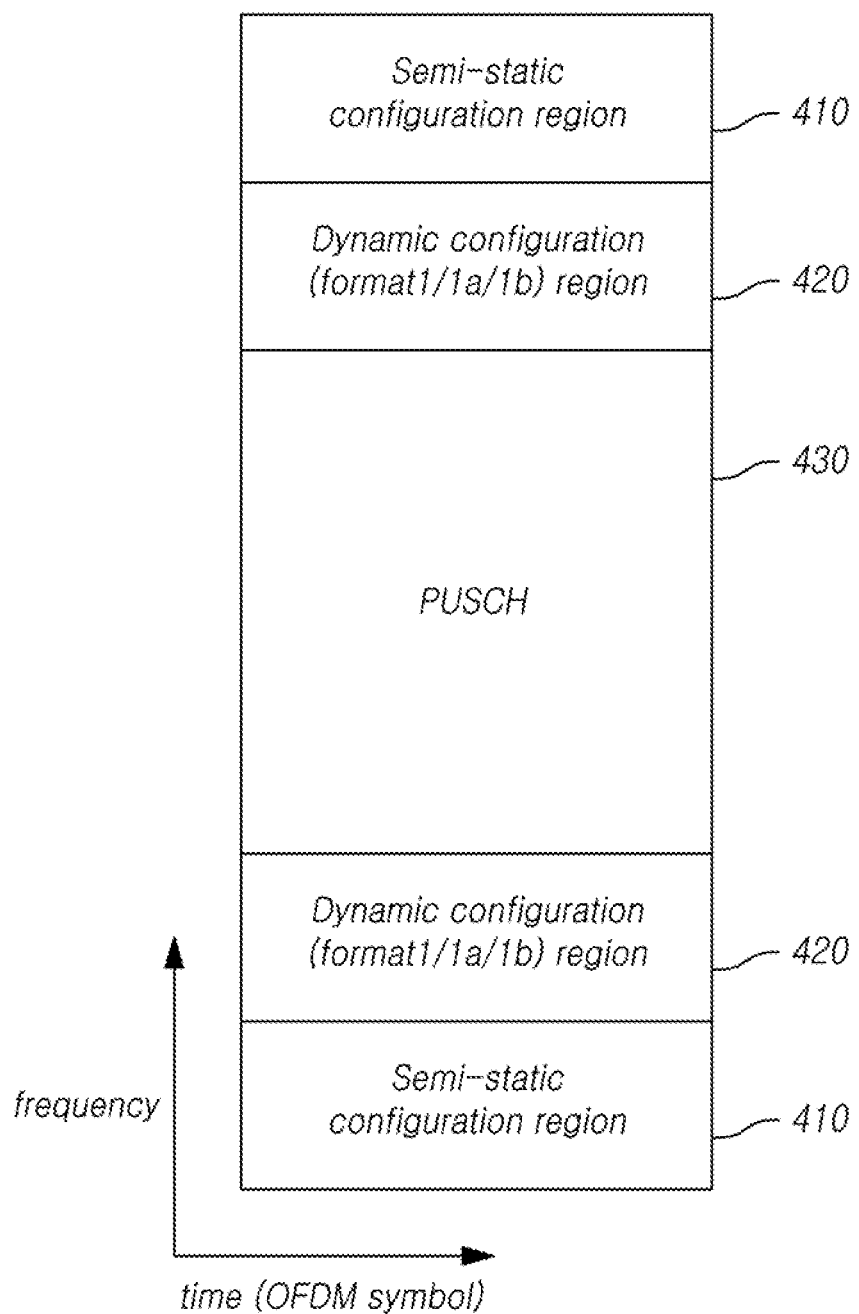
FIG. 4 illustrates mapping of control information depending on each PUCCH format to resource blocks (RBs)

FIG. 4 illustrates mapping of control information depending on each PUCCH format to resource blocks (RBs).

As shown in FIG. 4, physical resource blocks (PRBs) to be used for transmission of PUCCH in slot $n_s$ may be defined by Formula 2 below.

$$n_{PRB} = \begin{cases} \left\lfloor \frac{m}{2} \right\rfloor & \text{if}(m+n_s \text{ mod } 2)\text{mod } 2 = 0 \\ N_{RB}^{UL} - 1 - \left\lfloor \frac{m}{2} \right\rfloor & \text{if}(m+n_s \text{ mod } 2)\text{mod } 2 = 1 \end{cases} \qquad \text{[Formula 2]}$$

In Formula 2, the variable m may depend on the PUCCH format.

For PUCCH formats 1, 1a, and 1b, the variable m may be as follows:

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

For PUCCH formats 2, 2a, and 2b, $m = \lfloor n_{PUCCH}^{(2,\tilde{p})}/N_{sc}^{RB} \rfloor$. For format 3, $m = \lfloor n_{PUCCH}^{(3,\tilde{p})}/N_{SF,0}^{PUCCH} \rfloor$.

In Formula 2, $n_{PRB}$ denotes physical resource-block (PRB) number, $N_{RB}^{UL}$ denotes the number of uplink resource-blocks, and $N_{sc}^{RB}$ denotes the number of subcarriers in one resource block. $N_{RB}^{(2)}$ is a value transferred by a higher-layer signaling. Herein, $N_{RB}^{(2)} \geq 0$ denotes resource blocks that are available for use by PUCCH formats 2/2a/2b transmission in each slot. $N_{cs}^{(1)}$ denotes the number of cyclic shifts used for PUCCH formats 1/1a/1b in a resource block used for a mix of PUCCH formats 1/1a/1b and 2/2a/2b. The value of $N_{cs}^{(1)}$ is an integer multiple of $\Delta_{shift}^{PUCCH}$. $\Delta_{shift}^{PUCCH}$ may be transferred by a higher-layer signaling. Orthogonal resources used for transmission of PUCCH formats 1/1a/1b, 2/2a/2b and 3 may be represented by $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

Referring to Formula 2, at the outermost edges of an uplink bandwidth, resource blocks corresponding to $N_{RB}^{(2)}$ may be used for transmission of PUCCH formats 2/2a/2b. Such information ($N_{RB}^{(2)}$) may be transferred by a higher-layer signaling. A maximum of one resource block located in an inner region of the resource blocks for PUCCH formats 2/2a/2b transmission may be used for a mix of PUCCH formats 1/1a/1b and 2/2a/2b. Furthermore, $N_{cs}^{(1)}$ may correspond to a parameter representing the number of orthogonal resources for PUCCH formats 1/1a/1b in such resource block (i.e., in a resource block used for a mix of PUCCH formats 1/1a/1b and 2/2a/2b). Other resource blocks in the inner region may be used for PUCCH formats 1/1a/1b transmission.

In Formula 2, indices of resource blocks for only PUCCH formats 1/1a/1b may increase by "1" per unit of $n_{PUCCH}^{(1,\tilde{p})}$ resources as many times as the value of $c \cdot N_{SC}^{RB}/\Delta_{shift}^{PUCCH}$, for $n_{PUCCH}^{(1,\tilde{p})} \geq c \cdot N_{cs}^{(1)}/\Delta_{shift}^{PUCCH}$ per two slots in one subframe. That is, for each specific subframe to which PUCCH is mapped, the total number of resource indices $n'_{\tilde{p}}(n_s)$ within two resource blocks of a subframe constituted by two slots may be $c \cdot N_{SC}^{RB}/\Delta_{shift}^{PUCCH}$, represents the number of total resources with orthogonality in resource blocks.

That is $n_{PUCCH}^{(1,\tilde{p})}$ is a parameter representing an index of a corresponding orthogonal resource for antenna index $\tilde{p}$ among total orthogonal resources used for PUCCH formats 1/1a/1b. $n'_{\tilde{p}}(n_s)$ is a parameter representing an index of a corresponding orthogonal resource for antenna index $\tilde{p}$ among total orthogonal resources used in one resource block.

User equipment may receive downlink scheduling information through a legacy PDCCH (may be referred to as "a typical PDCCH") assigned to a control region of resource blocks. Furthermore, the user equipment may obtain corresponding PDSCH assignment information from the received downlink scheduling information. When receiving PDSCH, the user equipment may transmit HARQ ACK/NACK associated with PDSCH (i.e., the HARQ ACK/NACK corresponding to a response to the PDSCH reception). In this case, for each antenna port, PUCCH resource mapping for feedback transmission of the HARQ ACK/NACK may be determined based on a higher-layer parameter (e.g., an RRC parameter) and a control channel element (CCE) index, as described in Formula 3 and Formula 4 below. Herein, the CCE index may be an index of CCE used for transmission of corresponding downlink scheduling information.

$$n_{PUCCH}^{(1,\tilde{p}0)} = n_{CCE} N_{PUCCH}^{(1)} \quad \text{[Formula 3]}$$

$$n_{PUCCH}^{(1,\tilde{p}1)} = n_{CCE} + 1 + N_{PUCCH}^{(1)} \quad \text{[Formula 4]}$$

Formula 3 and Formula 4 may represent PUCCH resources $n_{PUCCH}^{(1,\tilde{p})}$ for HARQ ACK/NACK feedback transmission, in each of antenna port 0 and antenna port 1 of user equipment. Herein, the user equipment may support two antenna port transmission. $n_{CCE}$ may represent an index of the lowest CCE (i.e., a lowest CCE index) used for transmission of corresponding downlink scheduling information, and may be dynamically defined. $N_{PUCCH}^{(1)}$ may be a cell-specific parameter configured by a higher-layer signaling (e.g., an RRC signaling). Furthermore, $N_{PUCCH}^{(1)}$ may be used to determine a starting position of a PUCCH region assigned dynamically, by functioning as an offset for resource allocation associated with PUCCH formats 1/1a/1b.

As described above, in a region for PUCCH formats 2/2a/2b and a mixed region of PUCCH formats 2/2a/2b and PUCCH formats 1/1a/1b, resource blocks may be semi-statically determined by a higher-layer signaling. In a region for PUCCH formats 1/1a/1b, resource blocks may be dynamically determined. Accordingly, as described in FIG. 4, uplink transmission resources may be classified into semi-static configuration region 410, dynamic configuration region 420, and PUSCH region 430. Herein, PUCCH formats 1/1a/1b can be configured in dynamic configuration region 420.

A method of a PUCCH resource mapping according to Formula 3 and Formula 4 described above may be related to a PUCCH resource mapping for HARQ ACK/NACK transmission, in the case that user equipment associated with one serving cell transmits HARQ ACK/NACK using PUCCH formats 1a/1b in a frame structure type 1 (FDD) system. Furthermore, in the case of user equipment associated with at least one serving cell, i.e., the user equipment to which carrier aggregation is applied, PUCCH resource mapping rules may be defined as a function of the lowest CCE index and a higher-layer parameter, as described above. Alternatively, in this case, an ACK/NACK resource indication (ARI) scheme may be used. More specifically, after a plurality of candidate PUCCH resource values are configured by a higher-layer signaling in advance, a PUCCH resource value to be used among the candidate PUCCH resource values may be indicated through the information region "transmission power control (TPC) command for PUCCH" of downlink scheduling information.

Figure 5:
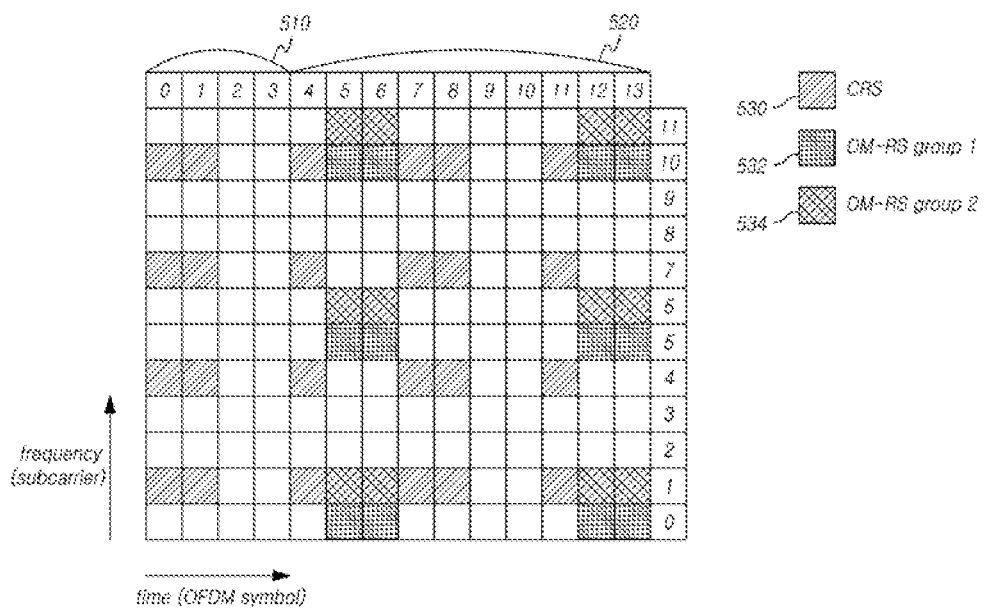
FIG. 5 illustrates one resource-block pair in a downlink subframe in the case of a normal cyclic prefix (normal CP) in a long term evolution (LTE) or LTE-Advanced (LTE-A) system.

FIG. 5 illustrates one resource-block pair in a downlink subframe in the case of a normal cyclic prefix (normal CP) in a long term evolution (LTE) or LTE-Advanced (LTE-A) system.

Referring to FIG. 5, in the case of a normal cyclic prefix (CP), one resource-block pair in a downlink subframe may include 14×12 resource elements (in the case of an extended CP, 12×12 resource elements). Herein, a resource element (RE) may be constituted by one OFDM symbol in the time axis, and by one subcarrier in the frequency axis.

One resource-block pair may include 14 OFDM symbols. Among the 14 OFDM symbols, preceding four OFDM symbols (l=0~3) may correspond to control region 510 assigned for control channels such as a physical control format indicator channel (PCFICH), a physical hybrid ARQ indicator channel (PHICH), a physical downlink control channel (PDCCH), and so forth. The remaining OFDM symbols (l=4~13) may correspond to data region 520 assigned for data channels such as a physical downlink shared channel (PDSCH). Although four OFDM symbols are allocated for control region 510 in FIG. 5, one to four OFDM symbols may be allocated for control region 510, according to embodiments. Information on the size of control region 510 may be transferred through the PCFICH. Herein, the size information may be set as the number of OFDM symbols.

Reference signals may be mapped to specific resource elements of a downlink. That is, a common reference signal (or cell-specific reference signal, hereinafter referred to as "CRS") 530, demodulation reference signals (DM-RS) (or UE-specific reference signals) 532 and 534, a channel-state information reference signal (CSI-RS), and so forth may be transmitted through a downlink. In FIG. 5, only CRS 530 and DM-RSs 532 and 534 have been illustrated for convenience of description.

CRS 530 located in control region 510 may be used to perform a channel estimation for decoding of PDCCH. CRS 530 located in data region 520 may be used for downlink channel measurement. Channel estimation for data decoding of data region 520 may be performed using DM-RSs 532 and/or 534.

Resources of control region 510 may correspond to system overhead, and therefore reduce resources of data region 520 available for data transmission. Meanwhile, In an LTE-A system capable of transmitting data to more users, system capacity enhancement may be restricted due to restricted resources of a typical control region (510). Accordingly, in order to increase control channel resources, considering a method of transmitting/receiving multi-user control channels might be required, such as using a spatial division multiplexing scheme in data region 520. In other words, such method may transmit/receive control channels in data region 520. For example, a control channel transmitted in data region 520 may be referred to as extended PDCCH or enhanced PDCCH (EPDCCH), and is not limited thereto.

In data region 520, control channel resources may be allocated in a unit of resource block (or resource-block pair) for compatibility with data channel resources (e.g., PDSCH resources). In the case of transmitting a control channel in data region 520, DM-RS may be used. Accordingly, the control channel may be transmitted using a beam-forming technique.

In the present description, the expression "assign control information" may have the same meaning as the expression "assign control channel(s)." In other words, in the present description, control channel assignment may mean that control information is assigned to resource elements.

An EPDCCH may be transmitted through at least one physical resource block (PRB) of a plurality of EPDCCH sets. Herein, each of the EPDCCH sets may be constituted by a PRB group (including an X number of PRB pairs). The X may be a natural number which is greater than or equal to "1" and is less than or equal to the number of PRB pairs associated with a downlink bandwidth.

An EPDCCH set may be of 'a localized type' or 'a distributed type" according to EPDCCH transmission types. In the case of the localized type, the above-described 'X' may be 1 or $2^{11}$ (where n=1, 2, 3, 4, or 5), and is not limited thereto. Meanwhile, in the case of the distributed type, the 'X' may be 2, 4, 8, or 16, and is not limited thereto.

A K number of EPDCCH sets may be UE-specifically configured. Herein, the maximum value of K may be one of 2, 3, 4, and 6, and is not limited thereto. The K number of EPDCCH sets may not necessarily include the same X number of PRB pairs.

Each EPDCCH set may be configured for either a localized EPDCCH or a distributed EPDCCH. That is, the each EPDCCH set may not be configured in a mix of the localized EPDCCH and the distributed EPDCCH. For example, the K number of EPDCCH sets may be configured be a KL number (KL=0, . . . , K) of sets for the localized EPDCCH and a KD number (KD=0, . . . , K) of sets for the distributed EPDCCH. Herein, KL and/or KD may be "0".

Meanwhile, the K number of EPDCCH sets may be assigned for one user equipment. In this case, since each EPDCCH set is of either a distributed type or a localized type, a KL number of localized EPDCCH sets and a KD number of distributed EPDCCH sets may be assigned for one user equipment. That is, a sum of KL and KD may be "K" (KL+KD=K).

In the K number of EPDCCH sets, the "K" may be maximally 2. In this case, combination of KL and KD may be one of {KL=1, KD=0}, {KL=0, KD=1}, {KL=1, KD=1}, {KL=0, KD=2}, and {KL=2, KD=0}.

PDCCH may be configured by 9~72 resource-element groups (REGs) according to a downlink control information (DCI) format and an aggregation level. Herein, the DCI format may correspond to control information received by user equipment, and the aggregation level may be used to raise a reliability of the PDCCH. A minimum of 9 REGs may be required since a maximum of 70-bit information should be transmitted through the DCI format. One resource element (RE) may transmit 2 bits since the RE is QPSK modulated, and therefore 35 REs may be required to transmit the 70-bit information. Accordingly, 36 REs (i.e., 9 REGs) may correspond to a minimum unit. In the case of PDCCH, a control channel element (CCE) constituted by 9 REGs may be a basic unit.

In order to perform a resource assignment for control information in a data region, a resource element grouping may be performed in a similar manner to the above-described example associated with PDCCH. In other words, an enhanced resource-element group (EREG) may be constituted by grouping a plurality of REs in the data region. Furthermore, an ECCE may be constituted by a plurality of the EREGs. In contrast to REG(s) used in a legacy PDCCH, a plurality of REs grouped in the data region may be referred to as "EREG(s)," and are not limited thereto.

A resource assignment for control information in a data region may be performed in units of ECCE. In other words, EPDCCH may be assigned in units of ECCE. Herein, ECCE corresponds to a basic unit for the resource or EPDCCH assignment.

EREGs may be grouped according to characteristics of index assigned to each resource element (RE) of a PRB.

Figure 6:
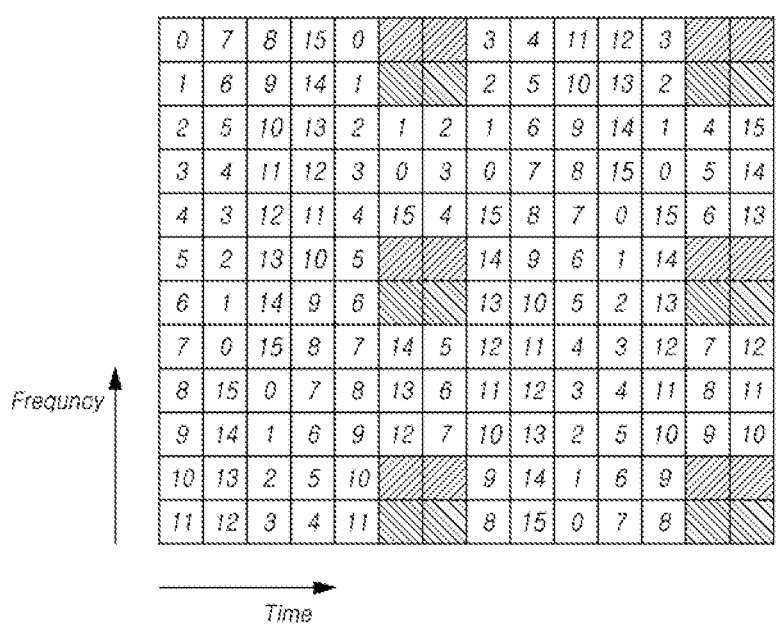
FIG. 6 illustrates indexing of resource elements in resource-block pairs.

FIG. 6 illustrates indexing of resource elements in resource-block pairs (e.g., PRB pairs).

Referring to FIG. 6, indexing in a resource-block pair (e.g., a PRB pair) may performed by repeatedly using 16 numbers in a frequency first manner. In the same symbol region, each resource element (RE) may be sequentially indexed (or numbered) from 0 according to frequency. When indexing in a certain symbol region is complete, indexing in the next symbol region may be continuously performed from a resource element neighboring to or closest to the last-indexed resource element of the certain symbol region. All resource elements within a corresponding resource-block pair (e.g., a PRB pair) may be indexed by such indexing procedure. For example, the numbers from 0 to 15 may be assigned to certain resource elements. Thereafter, next resource elements of the resource element indexed as "15" may be sequentially indexed (or numbered) from 0 to 15 again.

Among such indexed resource elements, resource elements having the same index may be grouped into one EREG. In the case that EREGs are configured by resource elements having the same index, one resource-block pair (e.g., one PRB pair) may include a total of 16 EREGs.

As described above, one ECCE may be constituted by either four or eight EREGs.

In the case of a localized EPDCCH transmission (i.e., an EPDCCH transmission of a localized type), ECCEs assigned for an EPDCCH transmission may be located in one resource-block pair (e.g., one PRB pair). In the case of a distributed EPDCCH transmission (i.e., an EPDCCH transmission of a distributed type), ECCEs assigned for an EPDCCH transmission may be located in two or more resource-block pairs (e.g., PRB pairs).

Figure 7:
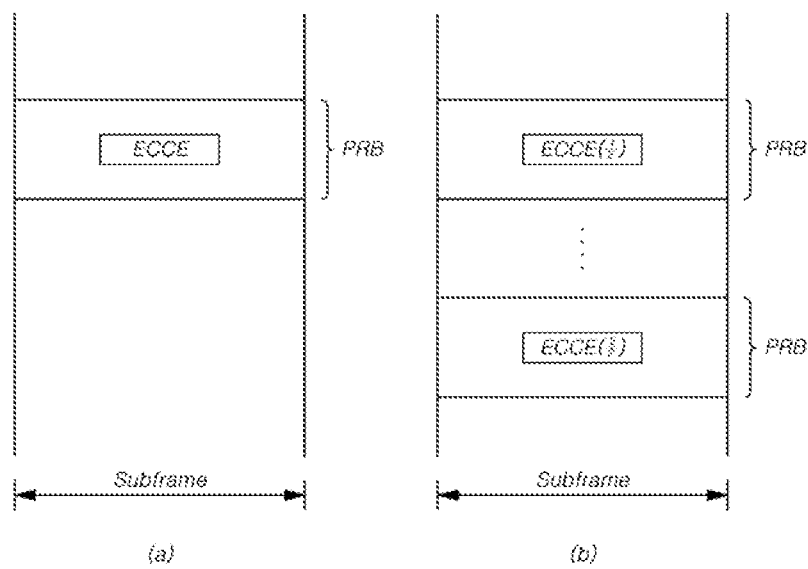
FIG. 7 illustrates two types of EPDCCH transmissions including a localized EPDCCH transmission and a distributed EPDCCH transmission.

FIG. 7 illustrates two types of EPDCCH transmissions including a localized EPDCCH transmission and a distributed EPDCCH transmission.

The number of downlink PRBs may be referred to as $N_{PRB}$. Herein, the downlink PRBs may constitute a system bandwidth supported in a certain cell configured by communication providers. EPDCCH may be transmitted through a corresponding PDSCH region. In this case, a transmission type of the EPDCCH may correspond to one of a localized EPDCCH transmission and a distributed EPDCCH transmission, as shown in FIGS. 7a and 7b. Accordingly, an ECCE structure and the number of resource elements (REs) constituting one ECCE may differ according to each EPDCCH transmission type. Alternatively, the ECCE structure and the number of resource elements (REs) per ECCE may be the same regardless of EPDCCH transmission types.

The localized EPDCCH transmission as shown in FIG. 7(a) may indicate that one ECCE is located and transmitted in one resource-block pair (e.g., one PRB pair). The distributed EPDCCH transmission as shown in FIG. 7(b) may indicate that one ECCE is located and transmitted in at least two resource-block pairs (e.g., two PRB pairs).

An ECCE may correspond to a specific number of EREGs. Each EREG may represent a specific number of available resource elements (REs). Accordingly, the ECCE may mean a set of REs available for EPDCCH transmission. The number of ECCEs required for a specific EPDCCH may differ depending on a size of control information (DCI payload) and a channel-coding rate. Herein, the number of ECCEs necessary for the specific EPDCCH may be referred to as an aggregation level (AL).

In the present specification, the number of resource elements (REs) constituting an ECCE for a localized EPDCCH transmission may be referred to as $N_{ECCE, L}$, and the number of resource elements (REs) constituting an ECCE for a distributed EPDCCH transmission may be referred to as $N_{ECCE, D}$. The maximum number of REs available for EPDCCH transmission in one PRB or one virtual resource block (VRB) may be referred to as $N_{RB, RE}$. Accordingly, in the case of the localized EPDCCH transmission, the number of ECCEs to be transmitted through a corresponding PRB (or VRB) may be $[N_{RB, RE}/N_{ECCE, L}]$. In the case of the distributed EPDCCH transmission, the number of ECCEs to be transmitted through a corresponding PRB (or VRB) may be $[N_{RB, RE}/N_{ECCE, D}]$. That is, in the case that the number of RBs used for other downlink physical signals and physical channels in a corresponding PRB (or VRB) is minimal, the maximum number of ECCEs to be transmitted through the corresponding PRB may be $[N_{RB, RE}/N_{ECCE, L}]$ or $[N_{RB, RE}/N_{ECCE, D}]$ according to EPDCCH transmission types as described above.

Meanwhile, in an LTE-A system, in the case that EPDCCH is newly adopted (or defined) in a data region (e.g., PDSCH region) in order to improve capacity of a downlink control channel, user equipment may receive downlink scheduling information through the EPDCCH. In this case, methods of configuring and/or mapping PUCCH resources are defined such that the user equipment performs a feedback transmission of uplink HARQ-ACK/NACK.

The present embodiment may provide a PUCCH resource configuration method and/or a PUCCH resource mapping method for an uplink HARQ ACK/NACK feedback transmission of user equipment, when the user equipment receives downlink scheduling information through the newly-defined EPDCCH. Particularly, in the case that the user equipment receives downlink control information (DCI) through the EPDCCH, the present embodiment may provide a method of defining an implicitly determined part and an explicitly determined part associated with determination of PUCCH resource mapping for the user equipment.

In a similar manner to Formula 3 and Formula 4 described above, PUCCH resource mapping functions according to the present embodiment may be expressed as a formula including an implicitly determined parameter $n_{implicit}$ (corresponding to $n_{CCE}$ in Formula 3 and Formula 4) determined based on ECCE, and an explicitly determined parameter $N_{explicit}^{(k)}$ (i.e., a modification parameter for $N_{PUCCH}^{(1)}$ in Formula 3 and Formula 4). For each antenna port, PUCCH resources may be determined by Formula 5 and Formula 6 below, respectively.

$$n_{PUCCH}^{(1,\tilde{p}0)} = n_{implicit} + N_{explicit}^{(k)} \quad \text{[Formula 5]}$$

$$n_{PUCCH}^{(1,\tilde{p}1)} = n_{implicit} + 1 + N_{explicit}^{(k)} \quad \text{[Formula 6]}$$

Meanwhile, a PUCCH resource mapping function may be defined as described in Formula 7 and Formula 8 below, by further including additional parameters in Formula 5 and Formula 6. Herein, the additional parameters may be at least one of an implicitly determined offset $\text{offset}_{implicit}$ and an explicitly determined offset $\text{offset}_{explicit}^{(k)}$.

$$n_{PUCCH}^{(1,\tilde{p}0)} = n_{implicit} + N_{explicit}^{(k)} + \text{offset}_{implicit} + \text{offset}_{explicit}^{(k)} \quad [\text{Formula 7}]$$

$$n_{PUCCH}^{(1,\tilde{p}1)} = n_{implicit} + 1 + N_{explicit}^{(k)} + \text{offset}_{implicit} + \text{offset}_{explicit}^{(k)} \quad [\text{Formula 8}]$$

Hereinafter, embodiments associated with each parameter (e.g., $n_{implicit}$, $N_{explicit}^{(k)}$, $\text{offset}_{implicit}$, and/or $\text{offset}_{explicit}^{(k)}$) will be described.

<Embodiments of $N_{explicit}^{(k)}$>

First, considering $N_{explicit}^{(k)}$, the $N_{explicit}^{(k)}$ may be explicitly determined, and the explicitly determined information may be transmitted by a higher-layer signaling. Herein, $N_{explicit}^{(k)}$ may be referred to as an explicitly determined parameter or a higher-layer configured parameter.

As described with reference to Formula 3 and Formula 4, $N_{PUCCH}^{(1)}$ may be a cell-specific parameter configured by a higher-layer signaling. Furthermore, $N_{PUCCH}^{(1)}$ may be used to determine a starting position of a PUCCH region assigned dynamically, by functioning as an offset for resource allocation associated with PUCCH formats 1/1a/1b. Similarly, the explicitly determined parameter $N_{explicit}^{(k)}$ may correspond to $N_{PUCCH}^{(1)}$ described in Formula 3 and Formula 4. Furthermore, $N_{explicit}^{(k)}$ may be used to determine a starting position of a PUCCH region assigned dynamically, by functioning as an offset for resource allocation. In this sense, $N_{explicit}^{(k)}$ may be referred to as "a value indicating a PUCCH resource starting offset" (i.e., "a PUCCH resource stating offset indication value"). A higher-layer signaling including a value of $N_{explicit}^{(k)}$ may be referred to as "information indicating a resource starting offset" (i.e., 'resource starting offset indication information').

Typically, user equipment (i.e., a typical user equipment) may receive downlink scheduling information (e.g., a DL scheduling grant) for a PDSCH transmission through a legacy PDCCH. In such typical case, values of RRC parameter $N_{PUCCH}^{(1)}$ are identically applied to all typical user equipment in a corresponding cell, for uplink HARQ ACK/NACK resource mapping. Herein, the values of RRC parameter $N_{PUCCH}^{(1)}$ are transmitted from a base station by cell-specific higher-layer signaling. In the present embodiment, user equipment may be configured to receive downlink scheduling information (e.g., a DL scheduling grant) for a PDSCH transmission, through EPDCCH. In a method of uplink HARQ ACK/NACK resource mapping for the user equipment according to the present embodiment, values corresponding to $N_{explicit}^{(k)}$ in Formula 5 to Formula 8 may be determined according to a following first method. The first method may determine $N_{explicit}^{(k)}$ values, by reusing cell-specific RRC parameter $N_{PUCCH}^{(1)}$ associated with a typical user equipment to which a legacy PDCCH is applied. Like a typical user equipment received DCI through a legacy PDCCH, even user equipment configured to receive DCI through EPDCCH may receive system information from a base station. Accordingly, in the case of PUCCH resource mapping for an uplink HARQ ACK/NACK transmission, the user equipment may use $N_{PUCCH}^{(1)}$ values included in the received system information.

In other embodiments of determining $N_{explicit}^{(k)}$, in the case of user equipment configured to receive DCI through EPDCCH, $N_{explicit}^{(k)}$ described above may be independently determined for each user equipment, by UE-specific higher-layer signaling. In other words, in the case that a certain user equipment is configured to receive DCI through EPDCCH, a corresponding transmission/reception point may transmit a value of $N_{explicit}^{(k)}$ explicit for the corresponding user equipment. Accordingly, the user equipment may perform PUCCH resource mapping according to Formula 5 to Formula 8, based on the value of $N_{explicit}^{(k)}$.

In still other embodiments of determining $N_{explicit}^{(k)}$, in the case of user equipment configured to receive DCI through EPDCCH, $N_{explicit}^{(k)}$ described above may be independently determined for each user equipment, by UE-specific higher-layer signaling. In this case, $N_{explicit}^{(k)}$ may not be a single value. That is, at least two $N_{explicit}^{(k)}$ values may be separately assigned. For example, $N_{explicit}^{(k)}$ for a PDSCH transmission based on downlink scheduling information transmitted through a distributed EPDCCH set, and $N_{explicit}^{(k)}$ for a PDSCH transmission based on downlink scheduling information transmitted through a localized EPDCCH set may be separately assigned. Herein, the distributed EPDCCH set may correspond to a set of PRBs for distributed EPDCCH transmission, or a distributed EPDCCH UE-specific Search Space (USS). The localized EPDCCH set may correspond to a set of PRBs for localized EPDCCH transmission, or a localized EPDCCH USS. In other words, two explicitly determined parameters, i.e., $N_{explicit,1}^{(k)}$ and $N_{explicit,2}^{(k)}$ explicit, may be assigned for a certain user equipment. In this case, when applying Formula 5 to Formula 8 corresponding to PUCCH resource mapping formulas for 'a PDSCH assignment through the distributed EPDCCH set' and 'a PDSCH assignment through the localized EPDCCH set' for a corresponding user equipment, $N_{explicit,1}^{(k)}$ and $N_{explicit,2}^{(k)}$ may be used, respectively.

In still other embodiments of determining $N_{explicit}^{(k)}$, in the case of user equipment configured to receive DCI through EPDCCH, $N_{explicit}^{(k)}$ described above may be independently determined for each user equipment, by UE-specific higher-layer signaling. In this case, $N_{explicit}^{(k)}$ may not be a single value. That is, at least two $N_{explicit}^{(k)}$ values may be separately assigned. For example, $N_{explicit}^{(k)}$ for a PDSCH transmission based on downlink scheduling information transmitted through a distributed EPDCCH set, and $N_{explicit}^{(k)}$ for a PDSCH transmission based on downlink scheduling information transmitted through a localized EPDCCH set may be separately assigned. Herein, the distributed EPDCCH set may correspond to a set of PRBs for distributed EPDCCH transmission, or a distributed EPDCCH UE-specific Search Space (USS). The localized EPDCCH set may correspond to a set of PRBs for localized EPDCCH transmission, or a localized EPDCCH USS. In other words, two explicitly determined parameters, i.e., $N_{explicit,1}^{(k)}$ and $N_{explicit,2}^{(k)}$ may be assigned for a certain user equipment. In this case, when applying Formula 5 to Formula 8 corresponding to PUCCH resource mapping formulas for 'a PDSCH assignment through the distributed EPDCCH set' and 'a PDSCH assignment through the localized EPDCCH set' for a corresponding user equipment, $N_{explicit,1}^{(k)}$ and $N_{explicit,2}^{(k)}$ may be used, respectively. In addition, UE-specific higher-layer signaling parameter $N_{explicit}^{(k)}$ may be separately assigned according to EPDCCH transmission types (e.g., a distributed type or a localized type) for a certain user equipment. Herein, the certain user equipment may be configured to receive DCI through EPDCCH. Alternatively, in the case that a plurality of EPDCCH sets are assigned for a certain EPDCCH transmission type, UE-specific higher-layer signaling parameter $N_{explicit}^{(k)}$ may be separately assigned per EPDCCH set.

Herein, each of the plurality of EPDCCH sets may be constituted by at least one resource-block pair (e.g., at least one PRB pair). More specifically, each EPDCCH set may be constituted by a group of 'X' PRB pairs, where the X is a natural number which is greater than or equal to "1" and is less than or equal to the number of PRB pairs associated with a downlink bandwidth. The number ("X") of the resource-block pairs constituting one EPDCCH set may be X=(1), 2, 4, or 8 for a localized type, and X=2, 4, 8, or (16) for a distributed type. For example, in the case of user equipment (e.g., UE 1) configured to receive DCI through EPDCCH, a $K_L$ number of EPDCCH sets may be assigned for a localized EPDCCH search space, and a $K_D$ number of EPDCCH sets may be assigned for a distributed EPDCCH search space. Herein, the $K_L$ number of EPDCCH sets may include EPDCCH set #1 through EPDCCH set #$K_L$. The $K_D$ number of EPDCCH sets may include EPDCCH set #1 through EPDCCH set #$K_D$. In this case, $N_{explicit,m}^{(k)}$ (where m=1, ..., $K_L$) may be separately assigned for each localized EPDCCH set #m (where m=1, ..., $K_L$). Similarly, $N_{explicit,n}^{(k)}$ (where n=1, ..., $K_D$) may be separately assigned for each distributed EPDCCH set #n (where n=1, ..., $K_D$). That is, in the case that a total of P number (e.g., P=$K_L$+$K_D$) of EPDCCH sets are assigned for a certain user equipment, a P number of higher-layer determined parameters $N_{explicit,P}^{(k)}$ (where P=1, ..., $K_L$+$K_D$) for PUCCH resource mapping per EPDCCH set may be assigned by UE-specific RRC signaling, for corresponding user equipment. Herein, the total of P number of EPDCCH sets may include a $K_L$ number of localized EPDCCH sets and a $K_D$ number of distributed EPDCCH sets.

In this case, in order to perform a PUCCH resource mapping for uplink HARQ ACK/NACK feedback associated with PDSCH transmission, the corresponding user equipment may apply $N_{explicit,P}^{(k)}$ corresponding to an EPDCCH set through which downlink scheduling information is transmitted. Herein, the downlink scheduling information may include information on corresponding PDSCH resource assignment.

Hereinafter, methods of configuring and mapping PUCCH resources using such $N_{explicit}^{(k)}$ information will be described with reference to FIG. 8 to FIG. 10.

Figure 8:
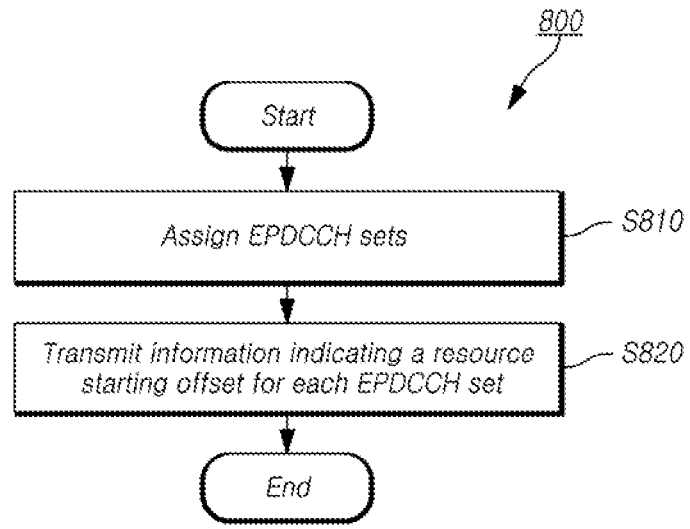
FIG. 8 is a flowchart illustrating a method of configuring a PUCCH resource using information on an explicitly determined parameter in a transmission/reception point in accordance with at least one embodiment.

FIG. 8 is a flowchart illustrating a method (800) of configuring a PUCCH resource using information on an explicitly determined parameter $N_{explicit}^{(k)}$ in a transmission/reception point in accordance with at least one embodiment.

Referring to FIG. 8, a method of configuring PUCCH resources may be performed in a transmission/reception point transmitting control information for user equipment through a data region of resource-block pairs in a subframe. More specifically, at step S810, the transmission/reception point may assign at least one EPDCCH set. Herein, each EPDCCH set may include an X number (e.g., X=2, 4, 8, or (16)) of resource-block pairs in the subframe. At step S820, the transmission/reception point may transmitting information indicating a PUCCH resource starting offset for each of the at least one EPDCCH set, to the user equipment. Hereinafter, the information indicating the PUCCH resource starting offset may be referred to as "PUCCH resource starting offset indication information."

The control information which the transmission/reception point transmits to the user equipment may include downlink scheduling information. Such control information may be transmitted through at least one ECCE to the user equipment. Herein, the at least one ECCE may be included in one EPDCCH set of the at least one EPDCCH set A lowest index of the at least one ECCE transmitting the control information, and 'PUCCH resource starting offset indication information' transmitted at step S820 may be used as a resource determination component, in the case of a PUCCH resource mapping for ACK/NACK associated with a PDSCH assigned according to the downlink scheduling information.

Referring back to Formula 5 to Formula 8, a lowest index of ECCEs transmitting control information may be used as a value of $n_{implicit}$, and a value indicating a PUCCH resource starting offset may be used as $N_{explicit}^{(k)}$.

At step S820, information indicating a resource starting offset (e.g., PUCCH resource starting offset indication information) may be transmitted by a higher-layer signaling. For example, the higher-layer signaling may be a radio resource control (RRC) signaling.

The control information transmitted to user equipment by the transmission/reception point may include downlink scheduling information. Furthermore, the downlink scheduling information may include dynamic offset indication information.

A value of $\text{offset}_{explicit}^{(k)}$ further added in Formula 7 and Formula 8 may be defined as a dynamic offset indication value. While a value of $N_{explicit}^{(k)}$ semi-statically determined by a higher-layer signaling, the $\text{offset}_{explicit}^{(k)}$ value may be indicated through the control information transmitted to the user equipment. For this reason, the $\text{offset}_{explicit}^{(k)}$ value may be referred to as the "dynamic offset indication value."

Dynamic offset indication information may be transmitted through downlink scheduling information. Such dynamic offset indication information may be used as another resource determination component, in the case of a PUCCH resource mapping for ACK/NACK feedback associated with a PDSCH assigned according to the downlink scheduling information.

Referring back to Formula 7 and Formula 8, a PUCCH resource mapping may be determined based on four resource determination components such as $n_{implicit}$, $N_{explicit}^{(k)}$, $\text{offset}_{implicit}$, and $\text{offset}_{explicit}^{(k)}$.

Example embodiments for $\text{offset}_{implicit}$ and $\text{offset}_{explicit}^{(k)}$ will be described later.

Figure 9:
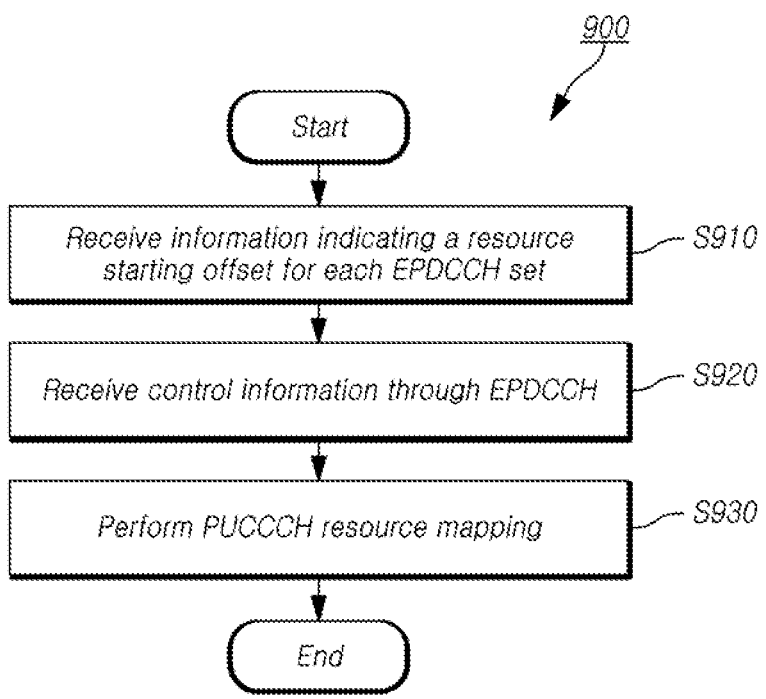
FIG. 9 is a flowchart illustrating a method of mapping a PUCCH resource using information on an explicitly determined parameter in user equipment in accordance with at least one embodiment.

FIG. 9 is a flowchart illustrating a method (900) of mapping a PUCCH resource using information on an explicitly determined parameter $N_{explicit}^{(k)}$ in user equipment in accordance with at least one embodiment.

Referring to FIG. 9, at step S910, the user equipment may receive 'PUCCH resource starting offset indication information' (i.e., information indicating a PUCCH resource starting offset) for each of at least one EPDCCH set, from a transmission/reception point. Herein, each EPDCCH set may include an X number of resource-block pairs in the subframe, and the X is a natural number greater than "1". Furthermore, the 'PUCCH resource starting offset indication information' may be received through a high-layer signaling (e.g., an RRC signaling).

In the case of the X number of resource-block pairs constituting one EPDCCH set, the X may be 2, 4, 8, (16), or (32) (i.e., X=2, 4, 8, (16), or (32)), and is not limited thereto. One EPDCCH set may or may not be constituted by a maximum of 16 resource-block pairs according to type of the EPDCCH set. For example, a distributed EPDCCH set may be constituted by 16 resource-block pairs. However, a localized EPDCCH set may be constituted by a maximum of 8 resource-block pairs.

At step S920, the user equipment may receive downlink scheduling control information through at least one enhanced control channel element (ECCE) included in one EPDCCH set of the at least one EPDCCH set, from the transmission/reception point.

At step S930, the user equipment may perform a PUCCH resource mapping for ACK/NACK feedback associated with a PDSCH assigned according to the downlink scheduling information. More specifically, the user equipment may perform the PUCCH resource mapping, by using the 'PUCCH resource starting offset indication information' and 'a lowest index of the at least one ECCE used for reception of the downlink scheduling information' as resource determination components.

Referring back to Formula 5 to Formula 8, a lowest index of ECCEs transmitting control information may be used as a value of $n_{implicit}$, and a value indicating a PUCCH resource starting offset may be used as $N_{explicit}^{(k)}$.

The downlink scheduling control information may include dynamic offset indication information. User equipment may perform a PUCCH resource mapping by further using $offset_{explicit}^{(k)}$ corresponding to the dynamic offset indication information as described in Formula 7 and Formula 8.

<Embodiments of $n_{implicit}$>

Embodiments of $n_{implicit}$ corresponding to another parameter used in Formula 5 to Formula 8 will be described in more detail. $n_{implicit}$ may be implicitly determined, and therefore be referred to as an implicitly determined parameter.

The number of downlink resource-block pairs (e.g., PRB pairs) may be referred to as $N_{PRB}$. Herein, the downlink resource-block pairs (e.g., PRB pairs) may constitute a system bandwidth supported in a certain cell configured by communication providers. EPDCCH may be transmitted through a corresponding PDSCH region. In this case, a transmission type of the EPDCCH may correspond to one of a localized EPDCCH transmission (i.e., an EPDCCH transmission of a localized type) and a distributed EPDCCH transmission (i.e., an EPDCCH transmission of a distributed type). Accordingly, an ECCE structure and the number of resource elements (REs) constituting one ECCE may differ according to each EPDCCH transmission type. In the present embodiment, the number of resource elements (REs) constituting an ECCE for a localized EPDCCH transmission may be referred to as $N_{ECCE,L}$, and the number of resource elements (REs) constituting an ECCE for a distributed EPDCCH transmission may be referred to as $N_{ECCE,D}$. The maximum number of REs available for EPDCCH transmission in one PRB or one virtual resource block (VRB) may be referred to as $N_{RB, RE}$. Accordingly, in the case of the localized EPDCCH transmission, the number of ECCEs to be transmitted through a corresponding PRB (or VRB) may be $[N_{RB, RE}/N_{ECCE, L}]$. In the case of the distributed EPDCCH transmission, the number of ECCEs to be transmitted through a corresponding PRB (or VRB) may be $[N_{RB, RE}/N_{ECCE, D}]$. That is, in the case that the number of RBs used for other downlink physical signals and physical channels in a corresponding PRB (or VRB) is minimal, the maximum number of ECCEs to be transmitted through the corresponding PRB may be $[N_{RB, RE}/N_{ECCE, L}]$ or $[N_{RB, RE}/N_{ECCE, D}]$ according to EPDCCH transmission types as described above.

Accordingly, in the case that an index of a lowest PRB (or VRB) among the PRBs (or VRBs) used for EPDCCH transmission to user equipment is defined as $n_{PRB}$, $n_{implicit}$ associated with a PUCCH resource mapping for an uplink HARQ ACK/NACK feedback transmission of the user equipment may differ according to types of EPDCCH transmission. More specifically, in the case that a corresponding EPDCCH is configured for the localized EPDCCH transmission, $n_{implicit}$ may correspond to $n_{PRB}*[N_{RB, RE}/N_{ECCE, L}]$. In the case that a corresponding EPDCCH is configured for the distributed EPDCCH transmission, $n_{implicit}$ may correspond to $n_{PRB}*[N_{RB, RE}/N_{ECCE, D}]$.

$n_{implicit}$ may be determined as a function of the number of blind decodings attempted until user equipment receives corresponding downlink scheduling information. For example, if the user equipment receives corresponding downlink scheduling information through $N^{th}$ blind decoding, "N" may be applied as a value of the above-described $n_{implicit}$.

For such embodiment, a blind decoding procedure for user equipment configured to receive DCI through EPDCCH is defined. Accordingly, as an EPDCCH blind decoding procedure of a corresponding user equipment, a blind decoding method depending on EPDCCH transmission types (i.e., "an EPDCCH transmission type dependent blind decoding method") may be defined. In the case of a certain user equipment (e.g., user equipment for which a certain EPDCCH is configured), both an EPDCCH search space of a distributed type (hereinafter, referred to as "a distributed EPDCCH search space") and an EPDCCH search space of a localized type (hereinafter, referred to as "a localized EPDCCH search space") may be configured for the user equipment. In this case, a blind decoding procedure may be defined such that a blind decoding can be performed in the distributed EPDCCH search space in advance, and then be performed in the localized EPDCCH search space. More specifically, in this case, the user equipment may perform a blind decoding in order of ECCE aggregation levels 1, 2, 4, and 8, in the distributed EPDCCH search space. Thereafter, the user equipment may change a search space into the localized EPDCCH search space, and then perform a blind decoding in order of ECCE aggregation levels 1, 2, 4, and 8, in the distributed EPDCCH search space. Alternatively, a blind decoding procedure of user equipment may be defined such that a blind decoding in the localized EPDCCH search space can be performed in advance.

In still other embodiments, a blind decoding method depending on aggregation levels (i.e., "an aggregation level dependent blind decoding method") may be defined. In this case, a blind decoding may be performed in order of ECCE aggregation levels 1, 2, 4, and 8. More specifically, in the case that both a distributed EPDCCH search space and a localized EPDCCH search space are configured in certain user equipment, a blind decoding may be defined such that the blind decoding is performed in order of aggregation levels from a lower aggregation level to a higher aggregation level. For example, a blind decoding may be performed in a distributed EPDCCH search space at aggregation level 1, and then be performed in a localized EPDCCH search space at aggregation level 1. Thereafter, even in the case of aggregation levels 2, 4, and 8, the blind decoding may be identically performed. Alternatively, a blind decoding may be defined such that the blind decoding is performed in an opposite order, i.e., according to a 'higher aggregation level'-first scheme. Herein, the 'higher aggregation level'-first scheme may mean that the blind decoding is performed in order of aggregation levels from a higher aggregation level to a lower aggregation level.

In the above case, a corresponding blind decoding order may be applied to only downlink scheduling information. Particularly, a decoding order associated with DCI format 1A corresponding to fallback downlink scheduling information (e.g., a fallback DL scheduling grant) of downlink scheduling information may be determined in advance, according to rules described above. Thereafter, a decoding order associated with a DCI format depending on a PDSCH transmission mode (i.e., "a PDSCH transmission mode dependent DCI format") may be subsequently determined.

In the case of user equipment configured to receive DCI through EPDCCH, ECCE indexing may be performed for each user equipment, in a search space configured UE-specifically. Furthermore, a lowest ECCE index associated with transmission of downlink scheduling information may be applied as a value of $n_{implicit}$ described above. Herein, the lowest ECCE index may be a lowest index of ECCEs used for transmission of the downlink scheduling information. Alternatively, the lowest ECCE index may be an index of the lowest ECCE (e.g., the first ECCE) used for transmission of the downlink scheduling information. For such ECCE indexing, ECCE indices may be separately defined for each search space configured according to EPDCCH transmission types. That is, in the case of an EPDCCH search space for certain user equipment, an M number of resource-block pairs (or PRBs) may be allocated (or configured) as a distributed EPDCCH search space. Furthermore, an L number of PRBs may be allocated (or configured) as a localized EPDCCH search space. In this case, $n_{ECCE,D}$ and $n_{ECCE,L}$ may be determined according to M and L values, respectively. Herein, $n_{ECCE,D}$ may represent the number of ECCEs created in the distributed EPDCCH search space according to an M value. $n_{ECCE,L}$ may represent the number of ECCEs created in the localized EPDCCH search space according to an L value. Accordingly, in an ECCE indexing scheme of a corresponding user equipment, ECCEs constituting the distributed EPDCCH search space may be numbered (or indexed) from 0 to $n_{ECCE,D}-1$ (i.e., in order of $0\sim(n_{ECCE,D}-1)$). Subsequently, ECCEs constituting the localized EPDCCH search space may be numbered from $n_{ECCE,D}$ to $n_{ECCE,D}+n_{ECCE,L}-1$ (i.e., in order of $n_{ECCE,D}\sim(n_{ECCE,D}+n_{ECCE,L}-1)$).

In still other embodiments, ECCE indexing may be defined such that an ECCE indexing of a distributed EPDCCH search space and an ECCE indexing of a localized EPDCCH search space are separately performed. In this case, ECCEs constituting the distributed EPDCCH search space may be numbered from 0 to $n_{ECCE,D}-1$ (i.e., $0\sim(n_{ECCE,D}-1)$). Meanwhile, ECCEs constituting the localized EPDCCH search space may be independently numbered from 0 to $n_{ECCE,L}-1$ (i.e., in order of $0\sim(n_{ECCE,L}-1)$).

In the case of user equipment configured to receive DCI through EPDCCH, ECCE indexing may be performed for each user equipment, in a search space configured UE-specifically. Furthermore, a lowest ECCE index associated with transmission of downlink scheduling information may be applied to a value of $n_{implicit}$ described above. Herein, the lowest ECCE index may be a lowest index of the ECCEs used for transmission of the downlink scheduling information. Alternatively, the lowest ECCE index may be an index of the lowest ECCE (e.g., the first ECCE) used for transmission of the downlink scheduling information.

In an ECCE indexing scheme for such embodiments, in the case of user equipment configured to receive DCI through EPDCCH, ECCE indexing may be performed according to an assigned resource block (or assigned resource blocks) and/or EPDCCH transmission types associated with a corresponding resource block (or corresponding resource blocks). Herein, the assigned resource block(s) may represent a resource block (or resource blocks) assigned for EPDCCH transmission for a corresponding user equipment.

For example, in the case that the maximum number of 'localized ECCEs' (i.e., ECCEs of localized types) transmitted through one PRB is referred to as $L_{max}$, corresponding $L_{max}$ may be determined according to $L_{max}=\lfloor N_{RB,RE}/N_{ECCE,L}\rfloor$.

In such case, a 'k' number of consecutive PRBs (or VRBs) from PRB (or VRB) #n to PRB (or VRB) #(n+k-1) may be assigned for localized EPDCCH transmission for a certain user equipment. When the number of localized ECCEs defined through the k number of PRBs (or VRBs) is defined as $K_{eCCE,L}(\le k\cdot L_{max})$, localized ECCE indexing for corresponding PRBs (or VRBs) may be sequentially performed from a lowest ECCE. Accordingly, localized ECCEs may be numbered from $n\cdot L_{max}$ to $(n\cdot L_{max}+K_{eCCE,L}-1)$ (i.e., in order of $n\cdot L_{max}\sim(n\cdot L_{max}+K_{eCCE,L}-1)$).

Alternatively, an 'm' number of distributive or consecutive PRBs (or VRBs) may be assigned for distributed EPDCCH transmission for a corresponding user equipment. In this case, when the number of distributed ECCEs defined through corresponding PRBs (or VRBs) is referred to as $K_{eCCE,D}(\le m\cdot L_{max})$, a distributed ECCE indexing for corresponding PRBs (or VRBs) may be sequentially performed from a lowest ECCE. Accordingly, distributed ECCEs may be numbered from 0 to $(K_{eccE,D}-1)$ (i.e., in order of $0\sim(K_{eCCE,D}-1)$).

In the case of user equipment configured to receive DCI through EPDCCH, a lowest PRB (or VRB) index associated with EPDCCH transmission for a corresponding user equipment may be applied to a value of $n_{implicit}$. Herein, the lowest PRB (or VRB) index may be a lowest index of the PRBs (or VRBs) used for EPDCCH transmission for the corresponding user equipment. Alternatively, the lowest PRB (or VRB) index may be an index of the lowest PRB (or VRB) used for EPDCCH transmission for the corresponding user equipment.

<Embodiments of $offset_{implicit}$>

Embodiments of $offset_{implicit}$ corresponding to a parameter used in Formula 7 and Formula 8 will be described in more detail. The parameter $offset_{implicit}$ may be referred to as "an implicitly determined offset."

In the case of user equipment configured to receive DCI through EPDCCH, the implicitly determined offset $offset_{implicit}$ in addition to an implicitly determined parameter $n_{implicit}$ and an explicitly determined parameter $N_{explicit}^{(k)}$ may be adopted (or introduced) in PUCCH resource mapping functions for uplink HARQ ACK/NACK feedback of the user equipment. In the case that the $offset_{implicit}$ is adopted, a value of $offset_{implicit}$ may be determined as values of a function which uses a parameter subset as a parameter. Herein, the parameter subset may be a subset of parameters such as a demodulation reference signal (DM-RS) antenna port number of a lowest ECCE transmitting downlink scheduling information for a corresponding user equipment, aggregation levels, a cell radio network temporary identifier (C—RNTI) of the corresponding user equipment, system bandwidth of a corresponding cell, the number of resource-block pairs ($N_{PRB}$), and so forth.

In at least one embodiment of determining the implicitly determined offset $offset_{implicit}$, a hashing function may be reused. Herein, the hashing function may determine a UE-specific search space for an existing legacy PDCCH at each aggregation level. A search space of user equipment according to an aggregation level (AL) may be determined by the hashing function such as $L\{(Y_k+m')\mod \lfloor N_{CCE,k}/L\rfloor\}+i$. In the present embodiment, such hashing functions may be applied by changing a value of $N_{CCE,k}$ into $N_{PRB}$. Herein, $N_{CCE,k}$ denotes the total number of CCEs of PDCCH in a certain sub frame k.

In still other embodiments, in the case that a DM-RS antenna port associated with EPDCCH for user equipment is referred to as "p", a corresponding $offset_{implicit}$ value may be determined according to "p". For example, Formula 9 below may be applied.

$$offset_{implicit} = p - 107 \quad [\text{Formula 9}]$$

In Formula 9, $p \in (107, 108, 109, 110)$

<Embodiments of $offset_{explicit}^{(k)}$>

Embodiments of $offset_{explicit}^{(k)}$ corresponding to a parameter used in Formula 7 and Formula 8 will be described in more detail. The parameter $offset_{explicit}^{(k)}$ may be referred to as "an explicitly determined offset."

In the case that user equipment is configured to receive DCI through EPDCCH, an "ACK/NACK resource indicator (or indication)" (hereinafter referred to as "ARI") information region for the user equipment may be defined within downlink scheduling information. Herein, the ARI information region may have a size of M bits. Furthermore, an "n" number (where "n" satisfies $n \leq 2^M$) of $offset_{explicit}$ values corresponding to each ARI value may be defined as described in Table 2 below. In this case, according to ARI values included in corresponding downlink scheduling information, $offset_{explicit}^{(k)}$ values may be applied to a corresponding user equipment. For such embodiment, an information field for configuration of ARI may be newly defined in DCI formats (e.g., DCI formats 1A, 2A, 2B, 2C, etc.) for downlink scheduling information. Alternatively, an existing information region may be used for corresponding ARI information. For example, an existing 2-bit information region for 'TPC command for PUCCH' may be used for ARI.

A value of $offset_{explicit}^{(k)}$ may be defined as a dynamic offset indication value. While a value of $N_{explicit}^{(k)}$ is semi-statically determined by a higher-layer signaling, the $offset_{explicit}^{(k)}$ value may be indicated through control information transmitted to user equipment. For this reason, the $offset_{explicit}^{(k)}$ value may be referred to as the "dynamic offset indication value."

The present embodiment will be described based on the case that "M" corresponding to a size of ARI is 2 (i.e., M=2). However, it is obvious that an identical concept can be applied to the cases of other "M" values.

TABLE 2

| ARI | $offset_{explicit}^{(k)}$ |
|---|---|
| '00' | $offset_{explicit}^{(0)}$ |
| '01' | $offset_{explicit}^{(1)}$ |
| '10' | $offset_{explicit}^{(2)}$ |
| '11' | $offset_{explicit}^{(3)}$ |

Hereinafter, three schemes below in accordance with the present embodiment will be described as a scheme of determining an "n" number ("n=4" in an example of Table 2) of explicitly determined offset parameters, i.e., $offset_{explicit}^{(k)}$ (k=0, ..., n−1). Herein, the explicitly determined offset parameter ($offset_{explicit}^{(k)}$ may correspond to an additional parameter adopted (or defined) according to the present embodiment.

First, one scheme ("a first scheme") determining the $offset_{explicit}^{(k)}$ based on downlink scheduling information for user equipment will be described hereinafter. In the first scheme, in the case that a certain user equipment is configured to receive DCI through EPDCCH, an "n" number of explicitly determined parameters may be UE-specifically configured by a UE-specific higher-layer signaling for the certain user equipment. Herein, the "n" number of explicitly determined parameters may include $offset_{explicit}^{(0)}$, $offset_{explicit}^{(1)}$, ..., $offset_{explicit}^{(n-1)}$. For example, in the case that 2-bit ARI is applied, either '4 offset values' or '3 offset values other than a default value ("0")' as described in Table 3 or Table 4 below may be configured by a UE-specific higher-layer signaling for each user equipment. Accordingly, different $offset_{explicit}^{(k)}$ per each user equipment may be applied according to ARI.

TABLE 3

| ARI | $offset_{explicit}^{(k)}$ |
|---|---|
| '00' | The 1$^{st}$ offset value configured by the higher layers, $offset_{explicit}^{(0)}$ |
| '01' | The 2$^{nd}$ offset value configured by the higher layers, $offset_{explicit}^{(1)}$ |
| '10' | The 3$^{rd}$ offset value configured by the higher layers, $offset_{explicit}^{(2)}$ |
| '11' | The 4$^{th}$ offset value configured by the higher layers, $offset_{explicit}^{(3)}$ |

TABLE 4

| ARI | $offset_{explicit}^{(k)}$ |
|---|---|
| '00' | 0 |
| '01' | The 1$^{st}$ offset value configured by the higher layers, $offset_{explicit}^{(1)}$ |
| '10' | The 2$^{nd}$ offset value configured by the higher layers, $offset_{explicit}^{(2)}$ |
| '11' | The 3$^{rd}$ offset value configured by the higher layers, $offset_{explicit}^{(3)}$ |

Another scheme ("a second scheme") determining the $offset_{explicit}^{(k)}$ based on downlink scheduling information for user equipment will be described hereinafter. In the second scheme, identical offset values may be applied to all user equipment by fixing offset values depending on ARI. In this case, it is necessary to minimize a collision between 'user equipment receiving DCI through an EPDCCH' and 'user equipment receiving DCI through a legacy EPDCCH,' and to efficiently assign PUCCH resources. Accordingly, in the second scheme, remaining values (e.g., 3, 5, 6, and 7) excluding the aggregation levels applied for link adaptation may be used as offset values depending on a corresponding ARI. In other words, the values "3, 5, 6, and 7" may be applied as offset values depending on ARI, as described in Table 5 below. Alternatively, as described in Table 6 below, three offset values excluding a default offset value may be applied as offset values depending on ARI. Herein, the three offset values may correspond to the remaining values (3, 5, and 7) excluding the even number "6" among the unused aggregation levels 3, 5, 6, and 7.

TABLE 5

| ARI | $offset_{explicit}^{(k)}$ |
|---|---|
| '00' | 3 |
| '01' | 5 |
| '10' | 6 |
| '11' | 7 |

TABLE 6

| ARI | offset$_{explicit}^{(k)}$ |
|---|---|
| '00' | 0 |
| '01' | 3 |
| '10' | 5 |
| '11' | 7 |

The above-described values (3, 5, 6, 7) used as offset$_{explicit}^{(k)}$ corresponds to one example. Accordingly, Table 7 below may be applied as another example of offset$_{explicit}^{(k)}$.

TABLE 7

| ACK/NACK Resource offset field in DCI format 1A/1B/1D/1/2A/2/2B/2C/2D | $\Delta_{ARO}$ |
|---|---|
| 0 | −2 |
| 1 | −1 |
| 2 | 0 |
| 3 | 2 |

Herein, the 'ACK/NACK resource offset field' may correspond to an ARI information field (or, may be referred to as "an ARI field") described above. $\Delta_{ARQ}$ may correspond to offset$_{explicit}^{(k)}$ values.

Still another scheme ("a third scheme") determining the offset$_{explicit}^{(k)}$ based on downlink scheduling information for user equipment will be described. In the third scheme, an offset value depending on ARI may be fixed. Furthermore, an offset mapping table depending on ARI may differ according to an aggregation level associated with EPDCCH transmitting corresponding downlink scheduling information. In other words, an ARI-offset$_{explicit}^{(k)}$ mapping table for aggregation level 1, an ARI-offset$_{explicit}^{(k)}$ mapping table for aggregation level 2, an ARI-offset$_{explicit}^{(k)}$ mapping table for aggregation level 4, and an ARI-offset$_{explicit}^{(k)}$ mapping table for aggregation level 8 may be defined. Accordingly, offset$_{explicit}^{(k)}$ may be determined according to an EPDCCH aggregation level for corresponding downlink scheduling information and ARI included the corresponding downlink scheduling information, and the determined offset$_{explicit}^{(k)}$ may be applied. For example, as described in Table 8 to Table 11 below, ARI-offset$_{explicit}^{(k)}$ mapping tables may be separately defined for each aggregation level.

TABLE 8

| ARI | offset$_{explicit}^{(k)}$ |
|---|---|
| '00' | 0 |
| '01' | 6 |
| '10' | 12 |
| '11' | 18 |

TABLE 9

| ARI | offset$_{explicit}^{(k)}$ |
|---|---|
| '00' | 0 |
| '01' | 12 |
| '10' | 24 |
| '11' | 36 |

TABLE 10

| ARI | offset$_{explicit}^{(k)}$ |
|---|---|
| '00' | 0 |
| '01' | 8 |
| '10' | 16 |
| '11' | 24 |

TABLE 11

| ARI | offset$_{explicit}^{(k)}$ |
|---|---|
| '00' | 0 |
| '01' | 16 |
| '10' | 24 |
| '11' | 36 |

In addition, PUCCH ACK/NACK resource mapping may be performed based on a sum of certain parameters among four parameters in FIG. 5 to FIG. 8 defined in the present embodiment. In this case, corresponding parameters used in the parameter sum may be configured in any and all combinations of above-described embodiments. It is obvious that such parameter sum and/or combinations are included in the scope of the present embodiment.

Figure 10:
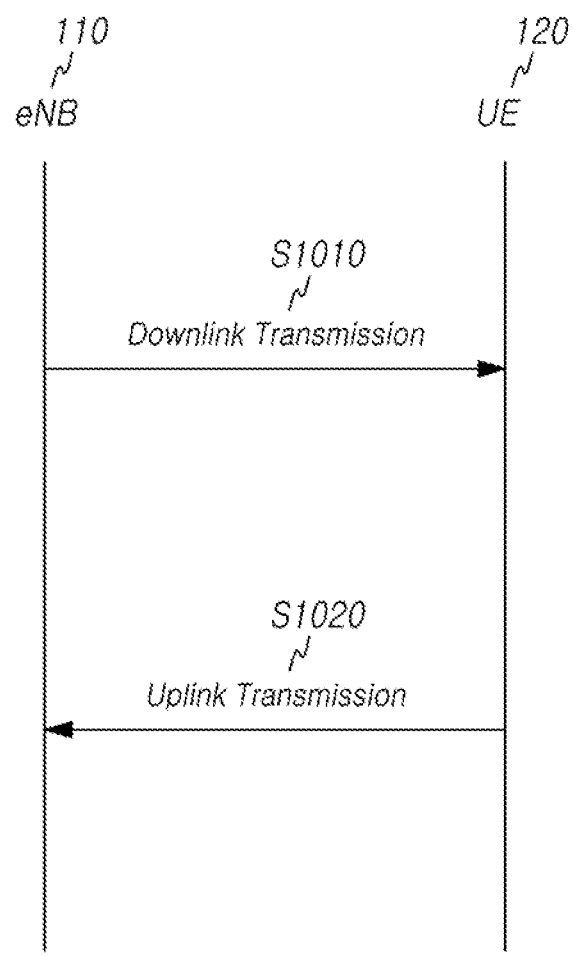
FIG. 10 is a flowchart illustrating a process including a downlink transmission of a transmission/reception point and an uplink transmission of user equipment in accordance with at least one embodiment.

FIG. 10 is a flowchart illustrating a process including a downlink transmission of a transmission/reception point and an uplink transmission of user equipment in accordance with at least one embodiment.

Referring to FIG. 10, at step S1010, eNB 110 corresponding to a transmission/reception point may perform a downlink transmission. Before performing downlink transmission, eNB 110 may transmit information on configuration parameters to user equipment 120 by a higher-layer signaling.

For example, eNB 110 may transmit information on an explicitly determined parameter N$_{explicit}^{(k)}$ according to embodiments of the above-described N$_{explicit}^{(k)}$ to user equipment 120 by the higher-layer signaling. Alternatively, eNB 110 may transmit information associated with an explicitly determined offset offset$_{explicit}^{(k)}$ (corresponding to an additional parameter) according to embodiments of the above-described offset$_{explicit}^{(k)}$ to user equipment 120.

In addition, before step S1010, in connection with the above-described parameters (e.g., n$_{implicit}$, N$_{explicit}^{(k)}$, offset$_{implicit}$, offset$_{explicit}^{(k)}$, information associated with configuration parameters may be transmitted to user equipment 120 by a higher-layer signaling.

At step S1010, eNB 110 may transmit control information to user equipment 120 through EPDCCH of a data region of resource-block pairs (e.g., PRB pairs) in a subframe. Herein, the control information may include downlink scheduling information. Furthermore, at step S1010, eNB 110 may transmit downlink data to user equipment 120 through PDSCH indicated (or assigned) by the downlink scheduling information.

In this case, in order to transmit control information including downlink scheduling information through EPDCCH of a data region of resource-block pairs (e.g., PRB pairs) in a specific subframe, eNB 110 may assign at least one localized EPDCCH set. Herein, each localized EPDCCH set may be constituted by an X number of PRB pairs (e.g., two PRB pairs) in the specific subframe. Furthermore, in an EPDCCH set assignment procedure, an 'n' number of localized EPDCCH sets and an 'm' number of distributed EPDCCH sets may be assigned. For simplification of description, the present embodiment will be described under the assumption that one localized EPDCCH set is assigned.

Meanwhile, eNB 110 may perform indexing of at least two ECCEs, per EPDCCH set. For example, in the case of at least one localized EPDCCH set (where each localized EPDCCH set is constituted by two PRB pairs), corresponding ECCEs constituting each localized EPDCCH set may be separately indexed. In the case that an 'n' number of localized EPDCCH sets and an 'm' number of distributed EPDCCH sets are assigned, ECCEs may be separately indexed per EPDCCH set.

At least one indexed ECCE may be assigned for control information. The control information may be transmitted through the assigned ECCE(s) to specific user equipment. In the case that the control information include downlink scheduling information, at step S1010, a downlink data transmission to user equipment 120 may be performed through PDSCH indicated by the downlink scheduling information.

In the case of user equipment, at step S1010, user equipment 120 may receive the control information including the downlink scheduling information, through EPDCCH from eNB 110. Furthermore, user equipment 120 may receive downlink data from eNB 110, through PDSCH indicated (or assigned) by the downlink scheduling information.

Since an ACK/NACK resource indicator (or indication) ("ARI") information field is defined in the downlink scheduling information, user equipment 120 may receive dynamic offset indication information through the ARI information field. As described in embodiments of $\text{offset}_{explicit}^{(k)}$, user equipment 120 may identify a dynamic offset value through the ARI information field for $\text{offset}_{explicit}^{(k)}$ table information (e.g., Table 3 and Table 4) transmitted by a higher-layer signaling, and/or table information (e.g., Table 5 to Table 10) associated with fixed offset values.

At step S1020, when performing an uplink transmission, user equipment 120 may transmit a scheduling request (SR), Hybrid ARQ (HARD) ACK for a received downlink data channel transmission blocks, and/or UE reports associated with a downlink channel state, through PUCCH. Furthermore, at step S1020, user equipment 120 may transmit uplink data through PUSCH. In the case that user equipment is UE 1 (120), UE 1(120) may perform an uplink transmission to eNB 110 corresponding to a first transmission/reception point, as shown in FIG. 1. Meanwhile, in the case that user equipment is UE 2 (122), UE 2 (122) may perform an uplink transmission to RRH 112 corresponding to a second transmission/reception point, as shown in FIG. 1.

Since a mapping procedure in which control information depending on each PUCCH format is mapped to resource blocks (RBs) was already described with reference to FIG. 4, the detailed description thereof is omitted.

At step S1020, user equipment 120 may receive downlink scheduling information through EPDCCH assigned (or defined) in data region of resource blocks. Furthermore, user equipment 120 may obtain corresponding PDSCH assignment information from the received downlink scheduling information. When receiving PDSCH, user equipment 120 may transmit HARQ ACK/NACK corresponding to a response to the PDSCH reception. In this case, for each antenna port, a PUCCH resource mapping for feedback transmission of the HARQ ACK/NACK may be performed using PUCCH resource determination components. Herein, the PUCCH resource determination components may include at least one of (i) an implicitly determined parameter $n_{implicit}$ (corresponding to $n_{CCE}$ in Formula 3 and Formula 4) determined based on ECCE, (ii) an explicitly determined parameter $N_{explicit}^{(k)}$ (corresponding to $N_{PUCCH}^{(1)}$ in Formula 3 and Formula 4), (iii) an implicitly determined offset $\text{offset}_{implicit}$, and (iv) an explicitly determined offset $\text{offset}_{explicit}^{(k)}$. Herein, $\text{offset}_{implicit}$ and $\text{offset}_{explicit}^{(k)}$ may correspond to additional parameters adopted (or defined) according to the present embodiment. Furthermore, in the case of receiving a PDSCH, user equipment 120 may transmit HARQ ACK/NACK corresponding to a response to the PDSCH reception. In this case, as described above, for each antenna port, a PUCCH resource mapping for feedback transmission of the HARQ ACK/NACK may be determined Formula 5 to Formula 8 above, respectively.

Figure 11:
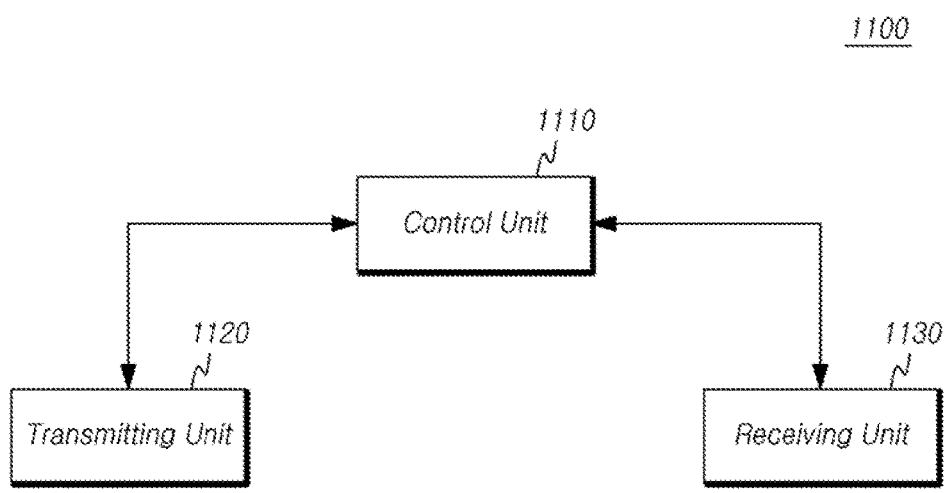
FIG. 11 is a diagram illustrating a base station in accordance with some embodiments.

FIG. 11 is a diagram illustrating a base station (e.g., base station 1100) in accordance with some embodiments.

Referring to FIG. 11, base station 110 corresponding to a transmission/reception point may transmit control information for user equipment, through a data region of resource-block pairs (e.g., PRB pairs) in a subframe. Such base station 110 may include control unit 1110, transmitting unit 1120, and receiving unit 1130.

Control unit 1110 may control operations of base station 1100, according to PUCCH resource configuration for uplink HARQ ACK/NACK feedback of user equipment. Control unit 1110 may be embodied as dedicated processor(s), input/output (I/O) interfaces, related memory and circuitry. Herein, the user equipment may be configured to receive DCI through EPDCCH required for performing the present embodiment.

Transmitting unit 1120 and receiving unit 1130 may transmit and receive, respectively, signals, messages, and/or data required for performing the above-described present embodiments, in connection with user equipment. Transmitting unit 1120 and receiving unit 1130 may be embodied as a radio transmitter and receiver, for example.

Base station 1100 described with reference to FIG. 11 may perform all functions of a base station according to the above-described present embodiments, through control unit 1110, transmitting unit 1120, and/or receiving unit 1130. Herein, the above-described present embodiments may include embodiments of $n_{implicit}$, embodiments of $N_{explicit}^{(k)}$, embodiments of $\text{offset}_{implicit}$, and/or embodiments of $\text{offset}_{explicit}^{(k)}$.

Hereinafter, the case where base station 1100 performs embodiments of $N_{explicit}^{(k)}$ as one example of the present embodiments will be described in more detail.

Control unit 1110 may assign at least one EPDCCH set. Herein, each EPDCCH set may be constituted by an X number of resource-block pairs (e.g., PRB pairs) in the subframe. The X may be a natural number which is greater than or equal to "1" and is less than or equal to the number of PRB pairs associated with a downlink bandwidth. More specifically, the X may be one of 2, 4, 8, and 16.

Transmitting unit 1120 may transmit 'uplink control channel resource starting offset indication information' (i.e., information indicating an uplink control channel resource starting offset) for each of the at least one EPDCCH set, to the user equipment.

The information indicating the uplink control channel resource starting offset may be information on $N_{explicit}^{(k)}$ described through Formula 5 to Formula 8, FIG. 8 to FIG. 10, and embodiments of $N_{explicit}^{(k)}$.

Transmitting unit 1120 may transmit such information indicating the uplink control channel resource starting offset, by a higher-layer signaling (e.g., an RRC signaling).

Transmitting unit 1120 may transmit control information to the user equipment through a data region of resource-block pairs (e.g., PRB pairs) in a subframe. Herein, the control information may include downlink scheduling information. The control information may be transmitted through at least one ECCE included in one EPDCCH set of the at least one EPDCCH set described in the above descriptions of control unit 1110.

The 'uplink control channel resource starting offset indication information' transmitted by transmitting unit 1120, and/or a lowest ECCE index associated with used for transmission of the control information may be used as one resource determination component, in the case of an uplink control channel resource mapping for ACK/NACK associated with a PDSCH assigned according to the downlink scheduling information. Herein, the lowest ECCE index may be a lowest index of ECCEs used for transmission of the control information. Alternatively, the lowest ECCE index may be an index of the lowest ECCE (e.g., the first ECCE) used for transmission of the control information.

The downlink scheduling information transmitted by transmitting unit 1120 may include dynamic offset indication information.

Such dynamic offset indication information may be information on $offset_{explicit}^{(k)}$ described through Formula 7 and Formula 8, FIG. 10, and/or embodiments of $offset_{explicit}^{(k)}$.

Transmitting unit 1120 may define an ARI information field in the downlink scheduling information, and transmit the dynamic offset indication information through the ARI information field. Such transmitted dynamic offset indication information may be used as another resource determination component, in the case of an uplink control channel resource mapping for ACK/NACK associated with a PDSCH assigned according to the downlink scheduling information.

Figure 12:
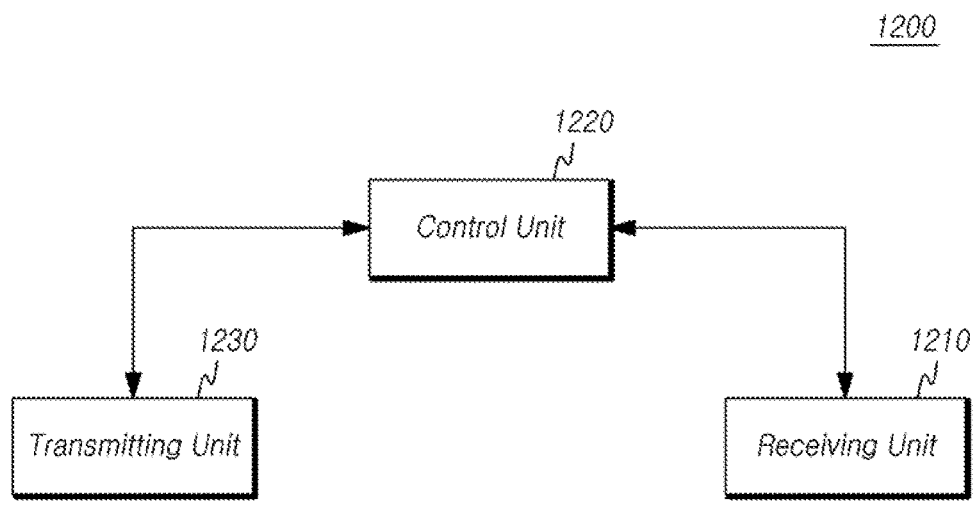
FIG. 12 is a diagram illustrating user equipment in accordance with some embodiments.

FIG. 12 is a diagram illustrating user equipment in accordance with some embodiments.

Referring to FIG. 12, user equipment 1200 according to the present embodiment may include receiving unit 1210, control unit 1220, and transmitting unit 1230. Control unit 1220 may be embodied as dedicated processor(s), input/output (I/O) interfaces, related memory and circuitry. Transmitting unit 1230 and receiving unit 1210 may be embodied as a radio transmitter and receiver, for example.

Receiving unit 1210 may receive downlink control information, data, and/or messages through a corresponding channel from a base station.

Control unit 1220 may control operations of user equipment 1200, according to a PUCCH resource mapping method for uplink HARQ ACK/NACK feedback of user equipment 1200. Herein, user equipment 1200 may be configured to receive DCI through EPDCCH required for performing the above-described present embodiment.

Transmitting unit 1230 may transmit control information, data, and/or messages through a corresponding channel, to a base station.

User equipment 1200 described with reference to FIG. 12 may perform all functions of user equipment according to the above-described present embodiments, through receiving unit 1210, control unit 1220, and/or transmitting unit 1230. Herein, the above-described present embodiments may include embodiments of $n_{implicit}$, embodiments of $N_{explicit}^{(k)}$, embodiments of $offset_{implicit}$, and/or embodiments of $offset_{explicit}^{(k)}$.

Hereinafter, the case where user equipment 1200 performs embodiments of $N_{explicit}^{(k)}$ as one example of the present embodiments will be described in more detail.

Receiving unit 1210 may receive 'uplink control channel resource starting offset indication information' (i.e., information indicating an uplink control channel resource starting offset) for each of at least one EPDCCH set, from a transmission/reception point (e.g., a base station). Herein, the each EPDCCH set may be constituted by an X number of resource-block pairs (e.g., PRB pairs) in the subframe. The X may be a natural number which is greater than or equal to "1" and is less than or equal to the number of PRB pairs associated with a downlink bandwidth. Furthermore, receiving unit 1210 may receive downlink scheduling control information through at least one ECCE included in one EPDCCH set of the at least one EPDCCH set, from the transmission/reception point.

In the case of the X number of resource-block pairs (e.g., PRB pairs) constituting one EPDCCH set, the X may be 2, 4, 8, (16), or (32) (i.e., X=2, 4, 8, (16), or (32)), and is not limited thereto. One EPDCCH set may or may not be constituted by a maximum of 16 resource-block pairs according to type of the EPDCCH set. For example, a distributed EPDCCH set may be constituted by 16 resource-block pairs. However, a localized EPDCCH set may be constituted by a maximum of 8 resource-block pairs.

The information indicating the 'uplink control channel resource starting offset' may be information on $N_{explicit}^{(k)}$ described through Formula 5 to Formula 8, FIG. 8 to FIG. 10, and embodiments of $N_{explicit}^{(k)}$.

Receiving unit 1210 may receive such information indicating the uplink control channel resource starting offset, by a higher-layer signaling (e.g., an RRC signaling).

Control unit 1220 may control an uplink control channel resource mapping for ACK/NACK associated with a PDSCH assigned according to the downlink scheduling control information. More specifically, control unit 1220 may perform the uplink control channel resource mapping, using the received 'uplink (control channel resource starting offset indication information' and/or a lowest ECCE index associated with used for reception of control information as resource determination components. Herein, the lowest ECCE index may be a lowest index of ECCEs used for reception of the control information. Alternatively, the lowest ECCE index may be an index of the lowest ECCE (e.g., the first ECCE) used for reception of the control information.

The downlink scheduling control information may include dynamic offset indication information. Control unit 1220 may perform an uplink control channel resource mapping, using the dynamic offset indication information as another resource determination component.

Such dynamic offset indication information may be information on $offset_{explicit}^{(k)}$ described through Formula 7 and Formula 8, FIG. 10, and embodiments of $offset_{explicit}^{(k)}$.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the attached documents below may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of configuring an uplink control channel resource in a transmission/reception apparatus transmitting control information for user equipment through a data region of resource-block pairs in a subframe, the method comprising:
assigning a plurality of enhanced physical downlink control channel (EPDCCH) sets to a single user equipment, wherein each of the plurality of EPDCCH sets includes an X number of resource-block pairs in the subframe, and the X is a natural number which is greater than or equal to "1" and is less than or equal to the number of physical resource-block pairs (PRB pairs) associated with a downlink bandwidth;
determining an uplink control channel resource starting offset associated with a starting position of a corresponding uplink control channel resource region for ACK/NACK feedback of the single user equipment, wherein the uplink control channel resource starting offset is UE-specifically determined in a corresponding cell, and is separately determined for each of the plurality of EPDCCH sets assigned to the single user equipment; and
transmitting information indicating the uplink control channel resource starting offset for each of the plurality of EPDCCH sets, and the control information including downlink scheduling control information, to the single user equipment, wherein the downlink scheduling control information includes dynamic offset indication information,
wherein in a case that the plurality of EPDCCH sets assigned to the single user equipment include both a plurality of localized type EPDCCH sets and a plurality of distributed type EPDCCH sets,
the determining of the uplink control channel resource starting offset per EPDCCH set includes:
performing a first determination procedure of separately determining an uplink control channel resource starting offset for each of the plurality of localized type EPDCCH sets; and
performing a second determination procedure of separately determining an uplink control channel resource starting offset for each of the plurality of distributed type EPDCCH sets;
wherein the first determination procedure and the second determination procedure are independent from each other; and
wherein in the case of an uplink control channel resource mapping for the ACK/NACK feedback associated with a physical downlink shared channel (PDSCH) assigned according to the downlink scheduling control information,
(i) the information indicating the uplink control channel resource starting offset determined per EPDCCH set according to an EPDCCH set type, (ii) a lowest index of at least one enhanced control channel element (ECCE) for a transmission of the control information, and (iii) the dynamic offset indication information are used as resource determination components.

2. The method of claim 1, wherein:
the control information including the downlink scheduling control information is transmitted through the at least one ECCE included in one EPDCCH set of the plurality of EPDCCH sets.

3. The method of claim 1, wherein:
the dynamic offset indication information is set to correspond to respective ACK/NACK resource indicator (ARI) information having a predetermined number of bits.

4. The method of claim 1, wherein antenna port information associated with a transmission of the downlink scheduling control information is used as another resource determination component, in the case of the uplink control channel resource mapping for the ACK/NACK associated with the PDSCH assigned according to the downlink scheduling control information.

5. The method of claim 1, wherein the transmitting includes:
transmitting the information indicating the uplink control channel resource starting offset to the single user equipment by a higher-layer signaling.

6. A method of mapping an uplink control channel resource in user equipment, the method comprising:
receiving information indicating an uplink control channel resource starting offset for each of a plurality of enhanced physical downlink control channel (EPDCCH) sets assigned to a single user equipment, from a transmission/reception apparatus, wherein each of the plurality of EPDCCH sets includes an X number of resource-block pairs in the subframe, and the X is a natural number which is greater than or equal to "1" and is less than or equal to the number of physical resource-block pairs (PRB pairs) associated with a downlink bandwidth, wherein the uplink control channel resource starting offset associated with a starting position of a corresponding uplink control channel resource region for ACK/NACK feedback of the single user equipment is UE-specifically determined in a corresponding cell and is separately determined for each of the plurality of EPDCCH sets assigned to the single user equipment, and wherein in a case that the plurality of EPDCCH sets assigned to the single user equipment include both a plurality of localized type EPDCCH sets and a plurality of distributed type EPDCCH sets, the determining of the uplink control channel resource starting offset per EPDCCH set includes (i) performing a first determination procedure of separately determining an uplink control channel resource starting offset for each of the plurality of localized type EPDCCH sets and (ii) performing a second determination procedure of separately determining an uplink control channel resource starting offset for each of the plurality of distributed type EPDCCH sets, wherein the first determination procedure and the second determination procedure are independent from each other;
receiving downlink scheduling control information through at least one enhanced control channel element (ECCE) included in one EPDCCH set of the plurality of EPDCCH sets, from the transmission/reception apparatus, wherein the downlink scheduling control information includes dynamic offset indication information; and
performing an uplink control channel resource mapping for the ACK/NACK feedback associated with a physical downlink shared channel (PDSCH) assigned according to the downlink scheduling control information, using (i) the information indicating the uplink control channel resource starting offset determined per EPDCCH set according to an EPDCCH set type, (ii) a lowest index of the at least one ECCE, and (iii) the dynamic offset indication information, as resource determination components.

7. The method of claim 6, wherein:
the dynamic offset indication information is set to correspond to respective ACK/NACK resource indicator (ARI) information having a predetermined number of bits.

8. The method of claim 6, wherein the receiving information indicating an uplink control channel resource starting offset includes:
receiving the information indicating the uplink control channel resource starting offset, by a higher-layer signaling.

9. The method of claim 6, wherein the performing includes:
performing the uplink control channel resource mapping, using antenna port information associated with transmission of the uplink scheduling control information as another resource determination component.

10. A transmission/reception apparatus transmitting control information for user equipment through a data region of resource-block pairs in a subframe, the transmission/reception apparatus comprising:
a control processor configured to assign a plurality of enhanced physical downlink control channel (EPDCCH) sets to a single user equipment, wherein each of the plurality of EPDCCH sets includes an X number of resource-block pairs in the subframe, and the X is a natural number which is greater than or equal to "1" and is less than or equal to the number of physical resource-block pairs (PRB pairs) associated with a downlink bandwidth; and
a transmitter configured to transmit information indicating an uplink control channel resource starting offset for each of the plurality of EPDCCH sets, to the single user equipment and to transmit the control information including downlink scheduling control information to the single user equipment, wherein the uplink control channel resource starting offset associated with a starting position of a corresponding uplink control channel resource region for ACK/NACK feedback is UE-specifically determined in a corresponding cell and is separately determined for each of the plurality of EPDCCH sets assigned to the single user equipment, and the downlink scheduling control information includes dynamic offset indication information,
wherein in a case that the plurality of EPDCCH sets assigned to the single user equipment include both a plurality of localized type EPDCCH sets and a plurality of distributed type EPDCCH sets,
the determining of the uplink control channel resource starting offset per EPDCCH set includes:
performing a first determination procedure of separately determining an uplink control channel resource starting offset for each of the plurality of localized type EPDCCH sets; and
performing a second determination procedure of separately determining an uplink control channel resource starting offset for each of the plurality of distributed type EPDCCH sets;
wherein the first determination procedure and the second determination procedure are independent from each other; and
wherein in the case of an uplink control channel resource mapping for the ACK/NACK feedback associated with a physical downlink shared channel (PDSCH) assigned according to the downlink scheduling control information,
(i) the information indicating the uplink control channel resource starting offset determined per EPDCCH set according to an EPDCCH set type, (ii) a lowest index of at least one enhanced control channel element (ECCE) for a transmission of the control information, and (iii) the dynamic offset indication information are used as resource determination components.

11. The transmission/reception apparatus of claim 10, wherein:
the control information including the downlink scheduling control information is transmitted through the at least ECCE included in one EPDCCH set of the plurality of EPDCCH sets.

12. The transmission/reception apparatus of claim 10, wherein:
the dynamic offset indication information is set to correspond to respective ACK/NACK resource indicator (ARI) information having a predetermined number of bits.

13. The transmission/reception apparatus of claim 10, wherein antenna port information associated with transmission of the downlink scheduling control information is used as another resource determination component, in the case of the uplink control channel resource mapping for the ACK/NACK feedback associated with the PDSCH assigned according to the downlink scheduling control information.

14. The transmission/reception apparatus of claim 10, wherein the transmitter is configured to transmit the information indicating the uplink control channel resource starting offset to the single user equipment by a higher-layer signaling.

15. User equipment comprising:
a receiver configured to:
(a) receive information indicating an uplink control channel resource starting offset for each of a plurality of enhanced physical downlink control channel (EPDCCH) sets assigned to the user equipment corresponding to a single entity, from a transmission/reception apparatus, wherein each of the plurality of EPDCCH sets includes an X number of resource-block pairs in the subframe, and the X is a natural number which is greater than or equal to "1" and is less than or equal to the number of physical resource-block pairs (PRB pairs) associated with a downlink bandwidth, wherein the uplink control channel resource starting offset associated with a starting position of a corresponding uplink control channel resource region for ACK/NACK feedback is UE-specifically determined in a corresponding cell and is separately determined for each of the plurality of EPDCCH sets assigned to the user equipment, and wherein in a case that the plurality of EPDCCH sets assigned to the user equipment include both a plurality of localized type EPDCCH sets and a plurality of distributed type EPDCCH sets, the determining of the uplink control channel resource starting offset per EPDCCH set includes (i) performing a first determination procedure of separately determining an uplink control channel resource starting offset for each of the plurality of localized type EPDCCH sets and (ii) performing a second determination procedure of separately determining an uplink control channel resource starting offset for each of the plurality of distributed type EPDCCH sets, wherein the first determination procedure and the second determination procedure are independent from each other, and (b) receive downlink scheduling control information through at least one enhanced control channel element (ECCE) included in one EPDCCH set of the plurality of EPDCCH sets, from the transmission/reception apparatus, wherein the downlink scheduling control information includes dynamic offset indication information; and a control processor configured to perform an uplink control channel resource mapping for the ACK/NACK feedback associated with a physical downlink shared channel (PDSCH) assigned according to the downlink scheduling control information, using (i) the information indicating the uplink control channel resource starting offset determined per EPDCCH set according to an EPDCCH set type, (ii) a lowest index of the at least one ECCE, and (iii) the dynamic offset indication information, as resource determination components.

16. The user equipment of claim 15, wherein:
the dynamic offset indication information is set to correspond to respective ACK/NACK resource indicator (ARI) information having a predetermined number of bits.

17. The user equipment of claim 15, wherein the receiver is configured to receive the information indicating the uplink control channel resource starting offset, by a higher-layer signaling.

18. The user equipment of claim 15, wherein the control processor is configured to perform the uplink control channel resource mapping, using antenna port information associated with a transmission of the downlink scheduling control information as another resource determination component.

* * * * *